United States Patent
Hondo et al.

(10) Patent No.: US 9,443,640 B2
(45) Date of Patent: Sep. 13, 2016

(54) METHOD FOR MANUFACTURING DISPERSION LIQUID OF CARBON NANOTUBE AGGREGATES

(75) Inventors: Kazunori Hondo, Nagoya (JP); Hidekazu Nishino, Nagoya (JP); Kenichi Sato, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 386 days.

(21) Appl. No.: 13/881,216

(22) PCT Filed: Oct. 28, 2011

(86) PCT No.: PCT/JP2011/074943
§ 371 (c)(1),
(2), (4) Date: Apr. 24, 2013

(87) PCT Pub. No.: WO2012/057320
PCT Pub. Date: May 3, 2012

(65) Prior Publication Data
US 2013/0214210 A1 Aug. 22, 2013

(30) Foreign Application Priority Data

Oct. 29, 2010 (JP) .................. 2010-243737
Mar. 30, 2011 (JP) .................. 2011-074643
May 31, 2011 (JP) .................. 2011-121497
Jul. 14, 2011 (JP) .................. 2011-155939

(51) Int. Cl.
*H01B 1/24* (2006.01)
*B05D 5/12* (2006.01)
*C01B 31/02* (2006.01)
*H01B 1/04* (2006.01)
(Continued)

(52) U.S. Cl.
CPC ............ *H01B 1/24* (2013.01); *B01F 11/02* (2013.01); *B05D 5/12* (2013.01); *B82Y 30/00* (2013.01);
(Continued)

(58) Field of Classification Search
CPC ............ H01B 1/00; H01B 1/18; H01B 1/24; B05D 5/12; B01D 11/00
See application file for complete search history.

(56) References Cited

U.S. PATENT DOCUMENTS

2005/0202578 A1* 9/2005 Yaniv et al. .................... 438/20
2009/0001326 A1* 1/2009 Sato et al. .................... 252/511
(Continued)

FOREIGN PATENT DOCUMENTS

JP      2007-056136 A      3/2007
JP      2008-189901 A      8/2008
(Continued)

OTHER PUBLICATIONS

King, A.G.. (2002). Ceramic Technology and Processing—Attritors. William Andrew Publishing/Noyes. Online version available at: http://app.knovel.com/hotlink/pdf/id:kt002O6SO4/ceramic-technology-processing/attritors.*

(Continued)

*Primary Examiner* — Mark Kopec
(74) *Attorney, Agent, or Firm* — RatnerPrestia

(57) ABSTRACT

Provided is a process for producing a dispersion liquid of carbon nanotube aggregates in which the carbon nanotube aggregates are dispersed in a dispersion medium, comprising the two steps: (A) a step of adsorbing a dispersant to carbon nanotube aggregates by physical dispersion treatment in a dispersion medium to prepare a carbon nanotube paste with a particle size of 100 nm to 20 μm resulting from partial dissociation of a mass of the carbon nanotube aggregates; and (B) a step of dispersing the carbon nanotube paste by ultrasonic dispersion treatment. A process for producing a dispersion liquid of carbon nanotube aggregates with reduced destruction and breakage of graphite structure of a carbon nanotube aggregate can be provided.

11 Claims, 3 Drawing Sheets

(51) Int. Cl.
  *H01B 13/30* (2006.01)
  *H01B 13/32* (2006.01)
  *B01F 11/02* (2006.01)
  *B82Y 30/00* (2011.01)
  *B82Y 40/00* (2011.01)

(52) U.S. Cl.
  CPC ............. *B82Y 40/00* (2013.01); *C01B 31/02* (2013.01); *C01B 31/0273* (2013.01); *H01B 1/04* (2013.01); *H01B 13/30* (2013.01); *H01B 13/322* (2013.01); *Y10T 428/259* (2015.01)

(56) References Cited

U.S. PATENT DOCUMENTS

| | | | |
|---|---|---|---|
| 2012/0132862 A1* | 5/2012 | Shin et al. | 252/511 |
| 2012/0292578 A1* | 11/2012 | Bacher et al. | 252/511 |
| 2013/0209791 A1* | 8/2013 | Oi et al. | 428/331 |

FOREIGN PATENT DOCUMENTS

| | | | | |
|---|---|---|---|---|
| JP | 2008-542980 A | | 11/2008 | |
| JP | 2009-286939 A | | 12/2009 | |
| WO | WO2009-008486 A1 | | 1/2009 | |
| WO | WO 2011/060839 | * | 5/2011 | ............. B82Y 30/00 |

OTHER PUBLICATIONS

Dai, Liming. (2006). Carbon Nanotechnology—Recent Developments in Chemistry, Physics, Materials Science and Device Applications—3.2 High-Energy Ball Milling. Elsevier. Online version available at: http://app.knovel.com/hotlink/pdf/id:kt0083ILN1/carbon-nanotechnology/solid-state-high-energy.*

International Search Report dated Feb. 7, 2012, application No. PCT/JP2011/074943.

* cited by examiner (a) (b) (c)

METHOD FOR MANUFACTURING DISPERSION LIQUID OF CARBON NANOTUBE AGGREGATES

CROSS REFERENCE TO RELATED APPLICATIONS

This application is the U.S. National Phase application of PCT International Application No. PCT/JP2011/074943, filed Oct. 28, 2011, and claims priority to Japanese Patent Application Nos. 2010-243737, filed Oct. 29, 2010, 2011-074643, filed Mar. 30, 2011, 2011-121497, filed May 31, 2011, and 2011-155939, filed Jul. 14, 2011

FIELD OF THE INVENTION

The present invention relates to a process for producing a dispersion liquid of carbon nanotube aggregates in which the carbon nanotube aggregates are dispersed in a dispersion medium. The present invention further relates to a transparent conductive film produced using a dispersion liquid of carbon nanotube aggregates obtained by the method of the present invention.

BACKGROUND OF THE INVENTION

Carbon nanotubes are substances having such a structure that a graphite sheet in which carbon atoms are arranged in a hexagonal network is cylindrically rolled; those which consist of one rolled layer are called a single-walled carbon nanotube, and those which consist of multiple rolled layers are called a multi-walled carbon nanotube. In particular, among the multi-walled carbon nanotubes, those which consist of two rolled layers are called a double-walled carbon nanotube. Carbon nanotubes themselves have excellent conductivity and are expected to be used as a conductive material.

In general, as a carbon nanotube, a single-walled carbon nanotube and a double-walled carbon nanotube with a small number of layers are known to have improved properties such as conductivity and thermal conductivity because they have a highly graphitic structure. However, these carbon nanotubes are likely to cause aggregation due to van der Waals force between adjacent carbon nanotubes and form a firm and very strong bundle structure composed of a plurality of carbon nanotubes. Consequently, the excellent conductivity and thermal conductivity that each carbon nanotube intrinsically has cannot be fully exerted, which is the biggest obstacle to industrial use of carbon nanotubes. To overcome such a high aggregability carbon nanotubes have, various dispersion methods have been proposed.

In Patent Document 1, as a method of dispersing carbon nanotubes in a solution, the method of adding single-walled carbon nanotubes into an amine solution and performing ultrasonication has been proposed.

Further, in Non-Patent Documents 1 and 2, not only ultrasonication, but also a dispersion method in which a surfactant is added to a solvent, and carbon nanotubes are covered by these substances, thereby improving the solventphilicity of the carbon nanotubes has also been proposed. Although the surfactants used in these Non-Patent Documents 1 and 2 are various, it is reported that single-walled carbon nanotubes are dispersed by adding sodium dodecyl sulfate or sodium cholate as a surfactant to the single-walled carbon nanotubes in a water solvent and performing ultrasonication.

PATENT DOCUMENT

Patent Document 1: WO 2009/008486

NON-PATENT DOCUMENTS

Non-Patent Document 1: The Journal of Physical Chemistry C, 2010, 114, 12490-12495
Non-Patent Document 2: The Journal of Physical Chemistry C, 2008, 112, 13187-13191

SUMMARY OF THE INVENTION

In any method disclosed in the prior art documents mentioned above, excellent properties that each carbon nanotube intrinsically has are tried to be brought out by subjecting the carbon nanotubes to ultrasonication for a long time and dissociating the bundles. However, the long-time ultrasonication has caused destruction and breakage of graphite structure of a carbon nanotube, still causing significant reduction in their properties.

The present invention has been made in view of the circumstances as described above, and it provides a process for producing a carbon nanotube dispersion liquid, wherein destruction and breakage of graphite structure of the carbon nanotube can be reduced. The present invention also provides a transparent conductive film produced using a dispersion liquid of carbon nanotube aggregates obtained by the method of the present invention.

To solve the problems described above, the process for producing a dispersion liquid of the present invention has a constitution as follows according to exemplary embodiments:

A process for producing a dispersion liquid of carbon nanotube aggregates in which the carbon nanotube aggregates are dispersed in a dispersion medium, comprising the two steps:

(A) a step of adsorbing a dispersant to carbon nanotube aggregates by physical dispersion treatment in a dispersion medium to prepare a carbon nanotube paste with a particle size of 100 nm to 20 μm resulting from partial dissociation of a mass of the carbon nanotube aggregates; and (B) a step of dispersing the carbon nanotube paste by ultrasonic dispersion treatment.

Further, the dispersion liquid of the present invention has a constitution as follows according to exemplary embodiments of this invention:

A dispersion liquid of carbon nanotube aggregates in which the carbon nanotube aggregates are dispersed in a dispersion medium, wherein the concentration of the carbon nanotube aggregates is 0.1% by mass to 10% by mass based on the total mass of the carbon nanotube aggregates, a dispersant, and the dispersion medium, and the carbon nanotube aggregates in the dispersion liquid of carbon nanotubes have an average length of not less than 2 μm and isolatedly dispersed.

In the process for producing a dispersion liquid of the present invention, in step (A), the physical dispersion treatment is preferably different from an ultrasonic dispersion treatment.

In the process for producing a dispersion liquid of the present invention, in step (A), the physical dispersion treatment is preferably a collision treatment, wherein the carbon nanotube aggregates are collided with spheres in the dispersion medium containing the dispersant, in a container in which the carbon nanotube aggregates, the dispersant, the dispersion medium, and the spheres are placed, or a treatment using any one of a magnetic stirrer, homo mixer, ribbon mixer, roll mill, rotary homogenizer, and paint shaker.

In the process for producing a dispersion liquid of the present invention, in step (B), it is preferable to disperse the carbon nanotube paste isolatedly by ultrasonic dispersion treatment.

In the process for producing a dispersion liquid of the present invention, in step (A), the physical dispersion treatment is preferably a collision treatment, wherein the carbon nanotube aggregates are collided with spheres in the dispersion medium containing the dispersant, in a container in which the carbon nanotube aggregates, the dispersant, the dispersion medium, and the spheres are placed.

In the process for producing a dispersion liquid of the present invention, in step (A), the physical dispersion treatment is preferably a vibration treatment of a container in which the carbon nanotube aggregates, the dispersant, the dispersion medium, and spheres are placed.

In the process for producing a dispersion liquid of the present invention, the dispersant content in a precipitate after centrifugal separator treatment of the carbon nanotube paste obtained in step (A) at 10,000 G for 15 minutes is preferably not less than 80% by mass of the total amount of the dispersant added into the container.

In the process for producing a dispersion liquid of the present invention, in step (A), it is preferable to vibrate a container in which each substance is placed so that the mass ratio of the dispersant to the carbon nanotube aggregates is 10 or less.

In the process for producing a dispersion liquid of the present invention, in step (A), the concentration of the carbon nanotube aggregates is preferably 0.1% by mass to 10% by mass based on the total mass of the carbon nanotube aggregates, the dispersant, and the dispersion medium.

In the process for producing a dispersion liquid of the present invention, in step (B), the concentration of the carbon nanotube aggregates in the carbon nanotube paste is preferably 0.01% by mass to 1% by mass when the carbon nanotube paste is subjected to ultrasonic dispersion treatment.

In the process for producing a dispersion liquid of the present invention, the carbon nanotube aggregates preferably comprise double-walled carbon nanotubes.

In the process for producing a dispersion liquid of the present invention, at least 70 out of 100 carbon nanotubes are preferably double-walled carbon nanotubes.

In the process for producing a dispersion liquid of the present invention, the dispersant is preferably a surfactant or water-soluble polymer.

In the dispersion liquid of the present invention, at least 70 out of 100 carbon nanotubes are preferably double-walled carbon nanotubes.

According to the present invention, by performing a physical dispersion treatment of carbon nanotube aggregates and a dispersant in a dispersion medium and to prepare a carbon nanotube paste resulting from partial dissociation of a mass of the carbon nanotube aggregates, the amount of ultrasonic irradiation necessary for a high degree of dispersion can be reduced, and a dispersion liquid of carbon nanotubes with reduced destruction and breakage of graphite structure of the carbon nanotubes can be produced.

DETAILED DESCRIPTION OF EMBODIMENTS OF THE INVENTION

Figure 1:
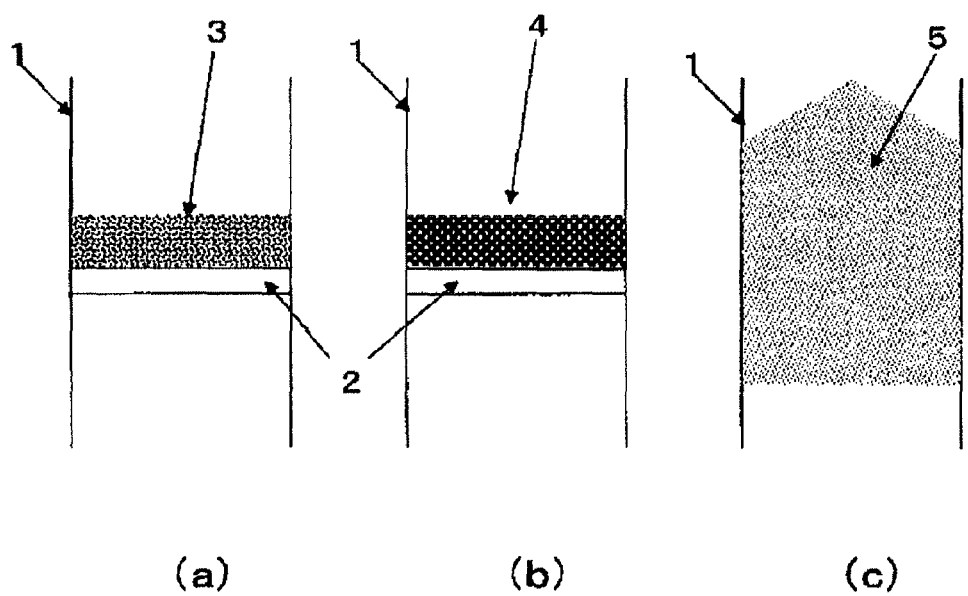
FIG. 1 shows states where a catalyst is uniformly present in the cross section of a reaction tube.

The present invention provides a process for producing a dispersion liquid of carbon nanotubes having the following features according to an exemplary embodiment.

The method provides a process for producing a dispersion liquid of carbon nanotube aggregates in which the carbon nanotube aggregates are dispersed in a dispersion medium, comprising the two steps: (A) a step of adsorbing a dispersant to carbon nanotube aggregates by physical dispersion treatment in a dispersion medium to prepare a carbon nanotube paste with a particle size of 100 nm to 20 µm resulting from partial dissociation of a mass of the carbon nanotube aggregates (step (A)); and (B) a step of diluting the carbon nanotube paste with the dispersion medium and highly dispersing the dilution by ultrasonic dispersion treatment (step (B)).

The carbon nanotube aggregate used in the present invention means a mass in which a plurality of carbon nanotubes exist, the existence form of which is not particularly limited, and each may exist individually or in, for example, a bundled or entangled form, or in a mixed form thereof. Further, those with different numbers of layers and diameters may be contained. Further, even in the case of being contained in a composition to which a dispersion liquid and other components are added or in a complex obtained by being combined with other components, as long as a plurality of carbon nanotubes is contained, it is understood that a carbon nanotube aggregate is contained with regard to such a plurality of carbon nanotubes. Further, although impurities (e.g., a catalyst) deriving from the process for producing a carbon nanotube can be contained, those which are composed substantially of carbon are shown.

Carbon nanotubes have a shape of a cylinder formed by rolling a sheet of graphite, and those which consist of one rolled layer are called a single-walled carbon nanotube; those which consist of multiple rolled layers are called a multi-walled carbon nanotube; and in particular, among them, those which consist of two rolled layers are called a double-walled carbon nanotube. The form of carbon nanotubes can be examined under a high-resolution transmission electron microscope. Although it is preferred that a layer of graphite be observed clearly in line under a transmission electron microscope, the graphite layer may be in disarray.

The carbon nanotube aggregate used in the present invention preferably comprise double-walled carbon nanotubes and more preferably comprise double-walled carbon nanotubes as a principal component. Further, at least 70 out of 100 carbon nanotubes are preferably double-walled carbon nanotubes. The number of carbon nanotubes here can be determined by observing any carbon nanotube contained in a carbon nanotube aggregate under a transmission electron microscope and counting the number of double-walled carbon nanotubes contained therein.

A specific way to count the number of any carbon nanotube described above and the number of layers is as described below. By observation under a transmission electron microscope at a magnification of 400,000×, 100 carbon nanotubes arbitrarily selected from a visual field in which carbon nanotubes account for 10% or more of the visual field area among 75-nm square visual fields are evaluated for the number of layers. When 100 measurements cannot be made in one visual field, measurements are made in a plurality of visual fields until 100 is reached. In this case, if a carbon nanotube is partially observed in a visual field, then it is counted as one carbon nanotube, and it is not necessary that both ends be observed. Further, even when carbon nanotubes are recognized as two in a visual field, they can be connected as one outside the visual field, in which case they are counted as two.

Among the carbon nanotube aggregates used in the present invention, those which have a mean value of an outer diameter of one carbon nanotube in the range of 1.0 nm to 3.0 nm are preferably used. The mean value of an outer diameter of one carbon nanotube is an arithmetic mean value obtained when a sample is observed in the same manner as described above: by observation under a transmission electron microscope at a magnification of 400,000×, 100 carbon nanotubes arbitrarily selected from a visual field in which carbon nanotubes account for 10% or more of the visual field area among 75-nm square visual fields are evaluated for the number of layers, and outer diameters of the carbon nanotubes are measured.

In general, the smaller the number of layers of a carbon nanotube, the higher the degree of graphitization, i.e., the higher the conductivity, and the larger the number of layers, the more likely the degree of graphitization is to decrease. Double-walled carbon nanotubes have high durability and a high degree of graphitization as well because of a larger number of layers than that of single-walled carbon nanotubes, and thus the percentage of double-walled carbon nanotubes is preferably larger in terms of a carbon nanotube aggregate with high durability and high conductivity. In the present invention, the percentage of double-walled carbon nanotubes when measured by the method described above is preferably at least 70 out of 100; it is more preferred that double-walled carbon nanotubes account for at least 75 out of 100; and, still more preferably, it is suitable that double-walled carbon nanotubes account for at least 80 out of 100.

The carbon nanotube aggregate used in the present invention preferably has a height ratio of G band to D band (G/D ratio) by Raman spectroscopic analysis at a wavelength of 633 nm of not less than 30, more preferably 40 to 200, and still more preferably 50 to 150. G/D ratio is a value obtained by evaluating a carbon nanotube aggregate by Raman spectroscopic analysis. The laser wavelength used in Raman spectroscopic analysis is 633 nm. In a Raman spectrum obtained by Raman spectroscopic analysis, a Raman shift observed near 1,590 $cm^{-1}$ is called a G band derived from graphite, and a Raman shift observed near 1,350 $cm^{-1}$ is called a D band derived from a defect of amorphous carbon or graphite. The carbon nanotube having a higher height ratio of a G band to a D band, G/D ratio, has a higher degree of graphitization, which indicates being of high quality. Raman spectroscopic analysis of solids such as a carbon nanotube aggregate can vary depending on the sampling. Thus, Raman spectroscopic analysis is performed at at least three different points, and the arithmetic mean is employed. Having a G/D ratio of not less than 30 indicates being a considerably high-quality carbon nanotube aggregate.

The carbon nanotube aggregate used in the present invention can be used as a transparent conductive substrate. When used as a transparent conductive substrate, the carbon nanotube aggregate is dispersed in a dispersion medium, if necessary, together with additives such as a surfactant and various polymeric materials to provide a dispersion liquid. The obtained dispersion liquid containing a carbon nanotube-containing composition can be applied to a substrate, and a transparent conductive substrate having a light transmittance of 85% or more and a surface resistance of not more than $1\times10^5 \Omega/\square$ after application can be produced.

The carbon nanotube aggregate used in the present invention is preferably subjected to an oxidation treatment to provide a high-quality carbon nanotube aggregate with a high G/D ratio as described above. Examples of oxidation treatments include, but are not limited to, an oxidation treatment in the liquid phase or gas phase.

The temperature of the oxidation treatment in the gas phase is preferably 300 to 1,000° C. and more preferably 400 to 900° C. The temperature of oxidation in the gas phase of the carbon nanotube aggregate is influenced by atmospheric gas, and therefore a particularly preferred temperature varies depending on the atmosphere. It also varies depending on whether the carbon nanotube that is contained mainly is single-walled or multi-walled. Specifically, when contacting with oxygen, for example, carrying out at 400 to 900° C. is preferred. In particular, in the case of a carbon nanotube aggregate mainly composed of multi-walled carbon nanotubes with two or more layers, it is preferable to carry out a burning treatment in ambient atmosphere within the range of the peak combustion temperature of the carbon nanotube aggregate ±50° C. Carrying out a burning treatment in the range of the peak combustion temperature ±50° C. allows removal of impurities in the carbon nanotube aggregate produced. This allows improvement of the purity of multi-walled carbon nanotubes including a double-walled one. If the burning treatment is carried out at lower than the peak combustion temperature −50° C., impurities and single-walled carbon nanotubes with low heat resistance are not removed because they are not readily burnt, and the purity of multi-walled carbon nanotubes including a double-walled one with high heat resistance is unlikely to improve. Alternatively, if the burning treatment is carried out at higher than the peak combustion temperature +50° C., all of the carbon nanotube aggregates formed are burnt and disappeared this time. Thus, the burning is preferably carried out near the peak combustion temperature of the carbon nanotube aggregate and more preferably in the range of the peak combustion temperature ±30° C. In the case where a gas mixture, for example, of oxygen and inert gas is used as the gas phase, it is preferable to carry out the oxidation treatment at a relatively low temperature when the oxygen concentration is high and at a relatively high temperature when the oxygen concentration is low.

If the carbon nanotube aggregates used in the present invention have been subjected to liquid-phase oxidation, it is preferred that the carbon nanotube aggregate be then dispersed mixed with a dispersion medium and additives without being dried because the dispersibility will be significantly improved. The method of subjecting to only liquid-phase oxidation or liquid-phase oxidation after gas-phase oxidation is preferred, and liquid-phase oxidation is more preferred because liquid-phase oxidation causes less destruction and breakage of graphite structure of the carbon nanotubes aggregates than gas-phase oxidation.

An acidic solution used in this liquid-phase oxidation is nitric acid, sulfuric acid, hydrogen peroxide, or mixed acid containing one of them. Preferred is nitric acid. Functionalizing the surface of a carbon nanotube using nitric acid or the like will improve the affinity to a dispersion medium and additives, and consequently the dispersibility will be improved.

Further, once carbon nanotubes have been dried, they tend to form firm bundles and can hardly be dispersed. Even if one tries to unfasten the bundles utilizing, for example, an ultrasonic homogenizer or the like by mixing the dried carbon nanotubes with additives and a dispersion medium, it takes enormous energy and time, and the carbon nanotubes themselves are prone to damage during the dispersion. In the case of dispersion without being dried, carbon nanotubes can be readily dispersed because they have not formed bundles as firmly as when dried, and the energy and time required for dispersion will be reduced; consequently, the damage the carbon nanotubes themselves suffer during the dispersion is minor. Therefore, to produce a dispersion liquid for forming a material having high conductivity, dispersing carbon nanotubes that have been subjected to liquid-phase oxidation, preferably, nitric acid treatment without being dried is highly effective.

The carbon nanotube aggregate used in the present invention preferably has a volume resistivity of not more than $1.0 \times 10^{-2}$ $\Omega \cdot cm$ and not less than $1.0 \times 10^{-4}$ $\Omega \cdot cm$, and the volume resistivity value of the carbon nanotube aggregate can be calculated by producing a carbon nanotube film as described below, measuring the surface resistance of the film by the four-terminal method, and then multiplying the surface resistance by the film thickness of the carbon nanotube film. The surface resistance can be measured with, for example, Loresta EP MCP-T360 (manufactured by DIA INSTRUMENTS CO., LTD.) using the four-terminal four-probe method in accordance with JIS K 7149. In high-resistance measurement, measurements can be made using Hiresta UP MCP-HT450 (manufactured by DIA INSTRUMENTS CO., LTD.).

For a measurement sample, 20 mg of carbon nanotube aggregates is mixed with 16 mL of N-methylpyrrolidone (NMP), and the resulting mixture is irradiated with ultrasonic waves using an ultrasonic homogenizer at an output power of 20 W for 20 minutes, and then mixed with 10 mL of ethanol; a filtrate is obtained by using a filtering machine with an inner diameter of 35 mm, but the filtrate is not collected at this point and a measurement sample can be prepared by drying this filtrate at 60° C. for 2 hours together with the filtering machine and the filter used for filtration. The film of carbon nanotube aggregates prepared can be measured by peeling off from a filter paper, for example, with tweezers, or when it cannot be peeled off, the total thickness of the filter and the film of carbon nanotube aggregates is measured, and then the thickness of the filter only may be subtracted from the total for calculation. For a filter for filtration used in filtration, a membrane filter (OMNIPORE MEMBRANE FILTERS, FILTER TYPE: 1.0 µm JA, diameter: 47 mm) can be used. Further, although the filter may have a pore size of 1.0 µm or less as long as a filtrate passes therethrough, it needs to be made of a material that will not be dissolved in NMP and ethanol, and, preferably, it is suitable to use a filter made of a fluororesin.

The carbon nanotube aggregate used in the present invention is preferably a carbon nanotube aggregate having a volume resistivity of $1 \times 10^{-4}$ $\Omega \cdot cm$ to $1 \times 10^{-2}$ $\Omega \cdot cm$; such a carbon nanotube aggregate is excellent particularly in conductivity, and therefore fully exhibits conductivity even with a small amount of carbon nanotubes when used, for example, in an conductivity layer which requires such transparency as that of a transparent electrode, and the effect of improving transparency due to the reduced amount can also be provided.

The carbon nanotube aggregate preferably used in the present invention is produced, for example, as described below.

In a vertical fluidized bed reactor, a fluidized bed of powder catalyst of iron-supported magnesia is formed over the whole horizontal section direction of the reactor, and methane is distributed in the vertical direction in the reactor to contact the methane with the catalyst at 500 to 1,200° C., thereby producing a carbon nanotube aggregate, after which the carbon nanotube aggregate obtained is subjected to oxidation treatment. Namely, the above-described gas phase or liquid-phase oxidation treatment of the carbon nanotube aggregate containing carbon nanotubes obtained by the method of synthesizing a carbon nanotube described above provides a carbon nanotube aggregate that can be particularly preferably used in the present invention.

By supporting iron, a catalyst, on magnesia, a carrier, the particle size of iron is readily controlled, and sintering is unlikely to occur at a high temperature even if iron is present at high density. Consequently, high-quality carbon tubes can be synthesized in large amounts with efficiency. Further, since magnesia is soluble in an acidic aqueous solution, both magnesia and iron can be removed only by treating with an acidic aqueous solution, and consequently a purification process can be simplified.

As magnesia, commercially available products may be used, or those synthesized may also be used. Examples of preferred methods of producing magnesia include heating magnesium metal in air, heating magnesium hydroxide to 850° C. or higher, heating magnesium carbonate hydroxide $3MgCO_3 \cdot Mg(OH)_2 \cdot 3H_2O$ to 950° C. or higher, and the like.

Light magnesia is preferred among magnesias. Light magnesia is magnesia with low bulk density, and specifically the bulk density is preferably not more than 0.20 g/mL and preferably 0.05 to 0.16 g/mL in terms of catalyst flowability. Bulk density is a powder mass per unit bulk volume. A method of measuring a bulk density is shown below. Bulk density of powder can be affected by the temperature and humidity at which measurements are made. The bulk density herein refers to a value when measurements are made at a temperature of 20±10° C. and a humidity of 60±10%. In the measurement, using a 50-mL graduated cylinder as a measurement container, powder is added such that a predetermined volume is occupied while tapping the bottom of the graduated cylinder. In the measurement of bulk density, the powder is added in an amount of 10 mL, but when measurable samples are insufficient, measurements are made in the amount as close as possible to 10 mL. Thereafter, after dropping the bottom of the graduated cylinder from a 1-cm height above the floor was repeated 20 times, a visual observation is made to confirm that the rate of change in the value of the volume that the powder occupies is within ±0.2 mL (±2% in the case of less samples), and the packing operation is stopped. If a change in the value of the volume beyond ±0.2 mL (±2%) is visually observed, powder is added while tapping the bottom of the graduated cylinder, and, again, the dropping the bottom of the graduated cylinder from a 1-cm height above the floor was repeated 20 times. Then, a visual observation is made to confirm that there is no change in the value of the volume that the powder occupies beyond ±0.2 mL (±2%), and the operation is stopped. Determining the weight of a certain amount of powder packed by the method described above was repeated three times, and a value obtained by dividing the average weight by the volume that the powder occupies (weight (g)/volume (mL)) is employed as a bulk density of the powder.

Iron that is supported on a carrier is not necessarily in the zero-valent state. It presumably is in the zero-valent metal state during a reaction, and, broadly, compounds containing iron or iron species may be used. For example, organic salts or inorganic salts such as iron formate, iron acetate, iron trifluoroacetate, iron ammonium citrate, iron nitrate, iron sulfate, and iron halide; complex salts such as an ethylenediaminetetraacetate complex and an acetylacetonato complex; and the like are used. Further, the iron is preferably a fine particle. The fine particle preferably has a particle size of 0.5 to 10 nm. When the iron is a fine particle, a carbon nanotube with a small outer diameter is easily formed.

The method of supporting iron on magnesia is not particularly limited. For example, magnesia is impregnated into a non-aqueous solution (for example, ethanol solution) or an aqueous solution in which a compound containing iron or iron species to be supported such as a salt of iron is dissolved, dispersively mixed thoroughly by stirring, ultrasonic irradiation, or the like, and then dried (impregnation method). Iron may be supported on magnesia by further heating at a high temperature (300 to 1,000° C.) in gas selected from air, oxygen, nitrogen, hydrogen, inert gas, and mixed gas thereof or in vacuum.

The larger the amount of iron to be supported, the higher the yield of carbon nanotubes, but when it is too large, the particle size of iron becomes large, and carbon nanotubes formed becomes thick. When the amount of iron to be supported is small, the particle size of iron supported becomes small and a carbon nanotube with a small outer diameter can be obtained, but the yield tends to be low. The optimal amount of iron to be supported varies depending on the pore capacity and outer surface area of magnesia and the supporting method, and iron is preferably supported in an amount of 0.1 to 20% by mass and particularly preferably 0.2 to 10% by mass based on magnesia.

The vertical fluidized bed reactor is preferably a reactor that is arranged such that methane is distributed in the vertical direction (which hereinafter may be referred to as "the longitudinal direction"). Methane is distributed in the direction from one end to the other end of the reactor and passes through a catalyst layer. As the reactor, for example, a tube-shaped reactor can preferably be used. The vertical direction described above also includes directions having some angle of inclination to the vertical direction (for example, 90°±15° with respect to the horizontal plane, preferably 90°±10°). Preferred is the vertical direction. A feed section and a discharge section of methane need not necessarily be at the ends of the reactor, and it is only required that methane be distributed in the direction described above and pass through the catalyst layer in the distribution process.

The catalyst, in the vertical fluidized bed reactor, is preferably in a state of existing over the whole horizontal section direction of the reactor and in a state of forming a fluidized bed at the reaction time. This allows an effective contact of the catalyst with methane. In the case of a horizontal reactor, for an effective contact of the catalyst with methane, in order to create the state of existing over the whole cross section of the reactor in the vertical direction to the flow of methane, it is necessary to sandwich the catalyst from left and right sides because of gravity. However, in the case of a formation reaction of carbon nanotube aggregates, as the reaction proceeds, carbon nanotube aggregates are formed on the catalyst to increase the volume of the catalyst, and therefore the method of sandwiching the catalyst from left and right sides is not preferred. In addition, it is difficult to form a fluidized bed in the horizontal reactor. In the present invention, a vertical reactor is preferably used, and a gas-permeable board is placed in the reactor and a catalyst is placed thereon, whereby the catalyst can exist uniformly in the cross section direction of the reactor without sandwiching the catalyst from both sides, and a fluidized bed can also be formed when methane is distributed in the vertical direction. The state where the catalyst exists over the whole horizontal section direction of the vertical fluidized bed reactor refers to a state where the catalyst is spread over the whole horizontal section direction so that the board at the bottom of the catalyst cannot be seen. Examples of preferred embodiments of such a state include, for example, embodiments as described below.

I. A gas-permeable board (e.g., ceramic filter) to place a catalyst is placed in a reactor, and the catalyst is loaded thereonto at a predetermined thickness. This catalyst layer may be somewhat vertically irregular (FIG. 1A). FIG. 1A is a conceptual diagram showing the state where a board to place a catalyst 2 is placed in a reactor 1 and a catalyst 3 exists thereon over the whole horizontal section direction of the reactor.

II. Onto the same board to place a catalyst as in I, a mixture of a catalyst and substances other than the catalyst (filler) is loaded. This catalyst layer is preferably even but may be somewhat vertically irregular (FIG. 1B). FIG. 1B is a conceptual diagram showing the state where the board to place a catalyst 2 is placed in the reactor 1 and a mixture 4 of a catalyst and substances other than the catalyst exists thereon over the whole cross section direction of the reactor.

III. A state where catalyst powder exists uniformly in the horizontal section direction of a reactor via gas by dropping the catalyst, for example, by spraying from above the reactor (FIG. 1C). FIG. 1C is a conceptual diagram showing a state of catalyst where a catalyst 5 sprayed from above the reactor 1 is spread over the whole horizontal section direction of the reactor. Examples of the vertical fluidized bed reactor include an embodiment such as C mentioned above in which a catalyst is dropped from above the reactor, for example, by spraying and an embodiment commonly called an ebullated bed in which a catalyst flows (method in accordance with I or II mentioned above).

The fluidized bed is preferred because continuous synthesis can be achieved by feeding a catalyst continuously and taking out the catalyst after reaction and an aggregate containing a carbon nanotube aggregate continuously, and a carbon nanotube aggregate can be obtained efficiently. In the present invention, magnesia is preferably used as carrier for a catalyst, and magnesia has very good flowability because of its particle properties (specific gravity, bulk density, surface charge, and the like) and is suitable for synthesizing a carbon nanotube aggregate particularly in a fluidized bed reactor. If a magnesia carrier is used as a catalyst, when a carbon nanotube aggregate is synthesized by the fluidized bed, a long carbon nanotube is easily formed because of good fluidization. The long carbon nanotube defined here is a carbon nanotube with an average length of 2 μm or more. Because of good flowability in a fluidized-bed reaction, raw material methane and a catalyst contact uniformly and efficiently; consequently, a carbon nanotube synthesis reaction proceeds uniformly, and coverage on the catalyst by impurities such as amorphous carbon is reduced, resulting in a prolonged catalytic activity.

In contrast to a vertical reactor, a horizontal reactor refers to a reaction apparatus in which a catalyst placed on a quartz plate is placed in a reactor placed in the transverse direction (the horizontal direction) and methane passes above the catalyst for a contact and reaction. In this case, carbon nanotubes are formed on the surface of the catalyst, but the reaction hardly occurs inside the catalyst because methane does not reach. On the other hand, in a vertical reactor, raw material methane can contact with a whole catalyst, thus a large amount of carbon nanotube aggregates can be synthesized efficiently.

The reactor is preferably heat resistant and preferably made of a heat-resistant material such as quartz and alumina.

Methane is passed from beneath or above through a catalyst layer placed in the reactor to contact and react with the catalyst, whereby a carbon nanotube aggregate is formed.

The temperature at which a catalyst and methane are contacted is preferably 600 to 950° C. and more preferably in the range of 700° C. to 900° C. When the temperature is lower than 600° C., the yield of carbon nanotube aggregates decreases. On the other hand, when the temperature is higher than 950° C., materials of the reactor used are restricted, and, in addition, carbon nanotubes start to unite with each other, and it is difficult to control the shape of carbon nanotubes. The reactor may be adjusted to a reaction temperature while contacting methane with a catalyst, or after completion of a thermal pretreatment, the reactor may be adjusted to a reaction temperature before starting to feed methane.

The catalyst may be subjected to thermal pretreatment before the reaction for forming a carbon nanotube aggregate. The time for the thermal pretreatment is not particularly limited, but it is preferably not more than 120 min because, if it is too long, agglomeration of metal occurs on magnesia and accordingly a carbon nanotube with a large outer diameter can be formed. The temperature of the pretreatment may be lower than, the same as, or higher than the reaction temperature as long as catalytic activity is exhibited. By carrying out the thermal pretreatment, the catalyst can be in a more active state.

The thermal pretreatment and the reaction for forming a carbon nanotube aggregate are preferably carried out under reduced pressure or atmospheric pressure.

When contact of the catalyst with methane is carried out under reduced pressure, the pressure in a reaction system can be reduced with a vacuum pump or the like. When the reaction is carried out under atmospheric pressure, the catalyst may be contacted with a mixed gas obtained by mixing methane with a diluent gas.

The diluent gas is not particularly limited, but those other than oxygen gas are preferably used. Oxygen is usually not used because it can explode, but it may be used if it is outside the explosive range. As the diluent gas, nitrogen, argon, hydrogen, helium, or the like is preferably used. These gases have an effect of controlling the linear velocity and concentration of methane and an effect as a carrier gas. Hydrogen is preferred because it has an effect on activation of catalytic metal. Nitrogen and argon are particularly preferred.

The carbon nanotube aggregate synthesized is used for preparation of a dispersion liquid after, usually, removal of the catalyst and, as required, purification, the oxidation treatment mentioned above, or the like.

As a dispersant used in the present invention, a surfactant, various polymeric materials (e.g., water-soluble polymeric material), and the like can be used. The dispersant serves to improve the dispersing ability, dispersion stabilizing ability, and the like of a carbon nanotube aggregate or fine particle. Although surfactants are classified into ionic surfactants and nonionic surfactants, any surfactant can be used in the present invention, and ionic surfactants are preferred because of their high dispersing ability. Examples of surfactants include, for example, surfactants as described below. These surfactants can be used alone or in combination of two or more thereof.

Ionic surfactants are classified into cationic surfactants, zwitterionic surfactants, and anionic surfactants. Examples of cationic surfactants include alkylamine salts, quaternary ammonium salts, and the like. Examples of zwitterionic surfactants include alkylbetaine surfactants and amine oxide surfactants. Examples of anionic surfactants include aromatic sulfonic acid surfactants such as alkylbenzene sulfonates such as dodecylbenzene sulfonate, and dodecylphenyl ether sulfonates; monosoap anionic surfactants; ether sulfate surfactants; phosphate surfactants; carboxylic acid surfactants; and the like. Among them, those containing an aromatic ring, i.e., aromatic ionic surfactants are preferred because of excellence in dispersing ability, dispersion stabilizing ability, and increasing the concentration, and in particular, aromatic ionic surfactants such as alkylbenzene sulfonates and dodecylphenyl ether sulfonates are preferred.

Examples of nonionic surfactants include sugar ester surfactants such as sorbitan fatty acid ester and polyoxyethylene sorbitan fatty acid ester; fatty acid ester surfactants such as polyoxyethylene resin acid ester and polyoxyethylene fatty acid diethyl; ether surfactants such as polyoxyethylene alkyl ether, polyoxyethylene alkylphenyl ether, and polyoxyethylene•polypropylene glycol; and aromatic nonionic surfactants such as polyoxyalkylene octylphenyl ether, polyoxyalkylene nonylphenyl ether, polyoxyalkyl dibutylphenyl ether, polyoxyalkyl styrylphenyl ether, polyoxyalkyl benzylphenyl ether, polyoxyalkyl bisphenyl ether, and polyoxyalkyl cumylphenyl ether. In the above, alkyl may be alkyl selected from $C_1$ to $C_{20}$. Among them, nonionic surfactants are preferred because of excellence in dispersing ability, dispersion stabilizing ability, and increasing the concentration, and in particular, polyoxyethylene phenyl ether, an aromatic nonionic surfactant, is preferred.

Examples of various polymeric materials include, for example, water-soluble polymers such as polyvinyl alcohol, polyvinyl pyrrolidone, ammonium polystyrene sulfonate, and sodium polystyrene sulfonate; saccharide polymers such as carboxymethylcellulose and salts thereof (e.g., sodium salt and ammonium salt), methylcellulose, hydroxyethylcellulose, amylose, cycloamylose, and chitosan; and the like. Further, conductive polymers such as polythiophene, polyethylenedioxythiophene, polyisothianaphthene, polyaniline, polypyrrole, and polyacetylene and derivatives thereof can also be used. In the present invention, water-soluble polymers are preferred, and in particular, by using a water-soluble polymer such as carboxymethylcellulose and salts thereof (e.g., sodium salt and ammonium salt), ammonium polystyrene sulfonate, or sodium polystyrene sulfonate, the conductive properties of a carbon nanotube aggregate can be exhibited efficiently, which is preferred. Further, when a water-soluble anionic surfactant such as carboxymethylcellulose sodium salt is used as an aqueous solution, a dispersion liquid preferably has an alkaline pH of 7 or higher and particularly preferably pH of 8 to 11, because dispersing ability improves due to increased electrostatic repulsion between surfactants. The pH can be adjusted by adding an alkaline solution. As an alkaline solution, a solution of ammonia or organic amine is used. Preferred organic amine is a nitrogen-containing organic compound such as ethanolamine, ethylamine, n-propylamine, isopropylamine, diethylamine, triethylamine, ethylenediamine, hexamethylenediamine, hydrazine, pyridine, piperidine, or hydroxypiperidine. Among these ammonia and organic amines, most preferred is ammonia. As a solvent for dissolving these organic amines and ammonia, water is preferably used. The pH is measured with a pH meter (manufactured by TOA Electronics Ltd., HM-30S).

The dispersion medium used in the present invention may be an aqueous solvent or a non-aqueous solvent. As a non-aqueous solvent, hydrocarbons (e.g., toluene and xylene), chlorine-containing hydrocarbons (e.g., methylene chloride, chloroform, and chlorobenzene), ethers (e.g., dioxane, tetrahydrofuran, and methyl cellosolve), ether alcohols (e.g., ethoxy ethanol and methoxy ethoxy ethanol), esters (e.g., methyl acetate and ethyl acetate), ketones (e.g., cyclohexanone and methyl ethyl ketone), alcohols (e.g., ethanol, isopropanol, and phenol), lower carboxylic acids (e.g., acetic acid), amines (e.g., triethylamine and trimethanol amine), nitrogen-containing polar solvents (e.g., N,N-dimethylformamide, nitromethane, and N-methylpyrrolidone), sulfur compounds (e.g., dimethyl sulfoxide), and the like can be used. Among them, the dispersion medium is preferably a dispersion medium containing water, alcohol, toluene, acetone, ether, and a combined solvent thereof. When an aqueous solvent is required, and when a binder is used as mentioned below and the binder is an inorganic polymeric binder, a polar solvent such as water, alcohol, or amine is used. Further, when one which is liquid at normal temperature is used as a binder as mentioned below, the binder itself can be used as a dispersion medium.

The particle size of the carbon nanotube aggregates after partial dissociation of a mass of carbon nanotube aggregates in a paste can be evaluated as described below. Namely, a carbon nanotube paste is diluted such that carbon nanotubes are contained in an amount of 0.03 mg/mL; particle size measurements are made three times using a particle size analyzer (manufactured by OTSUKA ELECTRONICS CO., LTD., ELS-Z2); and the average particle size is employed. A carbon nanotube aggregate that has been subjected to purification, oxidation treatment, or the like after synthesis is generally composed of a mass, and the particle size of the carbon nanotube aggregates diluted such that they are contained in an amount of 0.03 mg/mL cannot be measured because the carbon nanotube aggregates immediately sediment. However, by carrying out the physical treatment described above, the mass of carbon nanotube aggregates partially dissociates, and it will exist in the paste as a smaller particulate matter of carbon nanotube aggregates. For a paste containing such a particulate matter, carbon nanotube aggregates do not sediment when diluted such that they are contained in an amount of 0.03 mg/mL, and the particle size can be measured. From this particle size, the degree of dissociation of the mass of carbon nanotube aggregates in a paste can be assessed.

In the present invention, the particle size of the carbon nanotube aggregates in a paste prepared in step (A) after partial dissociation of a mass of carbon nanotube aggregates can be 100 nm to 20 μm, preferably 1 μm to 20 μm, and more preferably 1 μm to 10 μm. When the particle size of the carbon nanotube aggregates after partial dissociation of a mass of carbon nanotube aggregates in a paste is more than 20 μm, the dissociation of a mass of carbon nanotube aggregates is insufficient; consequently, the effect of reducing the amount of ultrasonic irradiation necessary for a high degree of dispersion is not observed, and the effect of reducing the destruction and breakage of graphite structure of a carbon nanotube cannot be obtained. Further, in the case of such a physical treatment that provides a particle size of the carbon nanotube aggregates after partial dissociation of a mass of carbon nanotube aggregates in a paste of less than 100 nm, not only the dissociation of a mass of carbon nanotube aggregates but also the breakage of a carbon nanotube occurs at the same time, and, consequently, the effect of reducing the destruction and breakage of graphite structure of a carbon nanotube cannot be obtained.

In step (A) in the process for producing a dispersion liquid of carbon nanotube aggregates of the present invention, a dispersant is adsorbed to carbon nanotube aggregates to prepare a carbon nanotube paste resulting from partial dissociation of a mass of carbon nanotube aggregates. This step is not particularly restricted if it is a physical dispersion treatment in which a carbon nanotube is provided with such relatively low energy that provides a particle size of the carbon nanotube aggregates after partial dissociation of a mass of carbon nanotube aggregates in a paste in a predetermined range and a physical dispersion treatment in which destruction and breakage of graphite structure of a carbon nanotube will not be caused by providing high energy. From this standpoint, it is preferable to refrain from employing ultrasonication in the treatment step (A) because destruction and breakage of graphite structure of a carbon nanotube can be caused by providing high energy.

For the physical dispersion treatment in preparing a paste, for example, an apparatus for causing physical dispersion by colliding a mixture of a dispersing object and a dispersion medium with spheres, such as a vibratory ball mill, ball mill, bead mill, or sand mill, and an apparatus such as a magnetic stirrer, homo mixer, ribbon mixer, roll mill, rotary homogenizer, attritor, or paint shaker can be used. In such a physical dispersion treatment, relatively low energy is provided, and, while reducing the destruction and breakage of graphite structure of a carbon nanotube, a dispersant is adsorbed to carbon nanotube aggregates efficiently in a short time to obtain a paste with a particle size of 100 nm to 20 μm, and 1 μm to 20 μm in a more preferred embodiment.

Above all, a collision treatment, wherein the carbon nanotube aggregates are collided with the spheres in the dispersion medium containing the dispersant, in a container in which carbon nanotube aggregates, a dispersant, a dispersion medium, and spheres are placed is preferred, and, further, a treatment using a vibratory ball mill for vibrating the container in which such substances were placed is more preferred. The spheres used here are preferably those which have a diameter of 0.1 mm to 5 mm, more preferably 0.3 mm to 2.5 mm, and still more preferably 0.6 mm to 1.5 mm. Although the material of the spheres is not limited, spheres having such hardness that vibration of a container causes reciprocation of the spheres and, as a result, the kinetic energy that the spheres have is imparted to a carbon nanotube to cause dissociation of a mass of carbon nanotube aggregates is desirable. Examples of the spheres include zirconia, alumina, stainless, agate, and the like.

Although the other conditions of the physical dispersion vary depending on the method of physical dispersion used and cannot be generalized, it is preferable to select conditions under which the particle size of the carbon nanotube aggregates after partial dissociation of a mass of carbon nanotube aggregates in a paste after dispersion is within the scope of the present invention, and, further, it is preferable to select conditions under which the dispersant adsorption amount described below is in a desired state.

The temperature for physical dispersion may be normal temperature, but when the output power employed for the physical dispersion is relatively high, it is preferable to carry out the physical dispersion with cooling so that a liquid temperature will not rise too high during the dispersion. The temperature during the physical dispersion treatment is preferably 0° C. to 50° C., more preferably 0° C. to 30° C., and still more preferably 0° C. to 20° C. In this range, carbon nanotubes and a dispersant stably interact, and good adsorption can be obtained.

In step (A) in the process for producing a dispersion liquid of carbon nanotube aggregates of the present invention, for the amount of dispersant adsorption to a carbon nanotube aggregate, a carbon nanotube paste was subjected to centrifugal separator treatment to be separated into a liquid layer and a precipitate layer, and the amount of the dispersant contained in the precipitate was used as an index. When a dispersant is scarcely adsorbed to a carbon nanotube, when a centrifugal separator treatment is carried out for separation into a liquid layer and a precipitate layer, the dispersant is contained in the liquid layer in large amounts, and, conversely, if a dispersant is sufficiently adsorbed to a carbon nanotube, the amount of the dispersant contained in a liquid layer is small even if a centrifugal separator treatment is carried out, and the majority is present in a precipitate layer. Thus, the amount of the dispersant contained in a precipitate was used as an index of the amount of dispersant adsorption to a carbon nanotube aggregate. For quantification of a dispersant, an analysis method depending on the type of the dispersant may be used as appropriate.

For example, when carboxymethylcellulose or a derivative thereof, or a salt thereof that can preferably be used in the present invention is used as a dispersant, the anthrone-sulfuric acid method, a method of quantifying saccharides, may be used. In this analysis method, glycosidic linkage in a polysaccharide is hydrolyzed with concentrated sulfuric acid, and the resultant is further dehydrated to produce furfural or a derivative thereof, which is then reacted with anthrone to form a complex having a blue-green color, and quantification of the saccharide is carried out by absorbance measurement. The dispersant is quantitatively determined by such a quantification method, and the amount of adsorption to a carbon nanotube can be determined.

In the present invention, when a dispersant of not less than 80% by mass of the total amount of the dispersant added into a container is contained in a precipitate after a centrifugal separator treatment of a carbon nanotube paste prepared in step (A) at 10,000 G for 15 minutes, it is preferred because the effect of reducing the amount of ultrasonic irradiation necessary for a high degree of dispersion is large. More preferred is not less than 85% by mass. There is no particularly preferred upper limit and it is most preferred that all the dispersant be adsorbed, but, in general, it is not more than 98% by mass.

For the amount of the dispersant added in step (A) in the process for producing a dispersion liquid of carbon nanotube aggregates of the present invention, the mass ratio of the dispersant to the carbon nanotube aggregates is preferably 10 or less, more preferably 0.8 to 6, still more preferably 0.8 to 3, and particularly preferably 0.8 to 2.5. When the mass ratio of the dispersant is in a preferred range described below, excellent properties such as conductivity that a carbon nanotube has can be exhibited. The more preferred amount of the dispersant for high dispersion of the carbon nanotube aggregates varies depending on the weight average molecular weight of the dispersant, and, preferably, it is relatively large when the dispersant has a low molecular weight and relatively small when the dispersant has a high molecular weight. For example, in the case where carboxymethylcellulose sodium salt is used as a dispersant, when the dispersant has a weight average molecular weight of more than 300,000, a preferred mass ratio is 0.8 to 2, more preferably 1 to 1.5, and particularly preferably 1 to 1.3, but when the weight average molecular weight is not more than 300,000, it is preferably 2 to 6, more preferably 2 to 3, and particularly preferably 2.2 to 2.8.

In step (A) in the process for producing a dispersion liquid of carbon nanotube aggregates of the present invention, the concentration of the carbon nanotube aggregates is preferably 0.1% by mass to 10% by mass based on the total mass of the carbon nanotube aggregates, the dispersant, and the dispersion medium. When the concentration of the carbon nanotube aggregates is in this preferred range, hard balls being reciprocated by a vibratory ball mill and the carbon nanotube aggregates collide with high probability, and the hard balls will not be prevented from moving in a container because the viscosity of the carbon nanotube paste in the container does not increase too much during the vibratory ball mill treatment.

Step (B) in the process for producing a dispersion liquid of carbon nanotube aggregates of the present invention is a step of highly and preferably isolatedly dispersing the carbon nanotube paste obtained in step (A) described above by ultrasonic dispersion treatment. In the present invention, "isolated dispersion" refers to a state where the average diameter of carbon nanotube aggregates dispersed in a dispersion liquid of carbon nanotube aggregates measured with an atomic force microscope (hereinafter referred to as AFM) is not more than the average diameter value of carbon nanotube aggregates determined using a transmission electron microscope by the method mentioned below plus 0.7 nm. In a more preferred embodiment, it is possible to achieve higher isolated dispersion, and it is also possible to achieve the average diameter of a dispersed carbon nanotube dispersed in a dispersion liquid of carbon nanotubes measured with an AFM of not more than the average diameter value of carbon nanotube aggregates determined using a transmission electron microscope by the method mentioned below plus 0.3 nm, particularly preferably not more than plus 0.1 nm.

A method of measuring the average diameter of carbon nanotube aggregates with an AFM is shown below. A liquid to be measured in which carbon nanotubes are dispersed is adjusted to have a carbon nanotube concentration of 0.003% by mass and spin-coated on a mica substrate. Thereafter, diameters of about 100 random carbon nanotube aggregates are measured using an AFM (manufactured by Shimadzu Corporation, SPM9600M), and the average thereof is determined. When carbon nanotube aggregates are a bundle of carbon nanotubes, the diameter of the aggregates is observed as a diameter of the bundle in the measurement with an AFM, and when carbon nanotubes are isolated, the original diameter of the carbon nanotube is observed. The average diameter calculated by averaging these diameters of carbon nanotube aggregates observed is evaluated and compared with the average diameter of carbon nanotubes observed using a transmission electron microscope, whereby the degree of isolated dispersion of carbon nanotubes in a dispersion liquid can be evaluated.

The measurement of the average diameter of carbon nanotube aggregates using a transmission electron microscope can be performed as described below. Namely, 1 mg of carbon nanotube aggregates is placed into 1 mL of ethanol, and a dispersion treatment is performed for about 15 min using an ultrasonic bath. A few drops of the dispersed sample is added dropwise on a grid and dried. The grid onto which the sample is thus applied is observed under a transmission electron microscope at 400,000× to measure the outer diameter of the carbon nanotube aggregates. An accelerating voltage is set at 120 kV. Outer diameters of 100 carbon nanotube aggregates arbitrarily selected are measured, and the arithmetic mean value is employed as the average diameter.

In step (B) in which a carbon nanotube paste prepared in step (A) is dispersed by ultrasonic dispersion treatment, a dispersion medium may be added or not. When a dispersion medium is added, the viscosity of the dispersion liquid of carbon nanotube aggregates after ultrasonication can be adjusted to be low, which is preferred because of ease of handling.

When a carbon nanotube paste is subjected to ultrasonic dispersion treatment in step (B), the concentration of the carbon nanotube aggregates in the carbon nanotube paste is preferably 0.01% by mass to 1% by mass and more preferably 0.01% by mass to 0.8% by mass. When the concentration of the carbon nanotube aggregates in the carbon nanotube paste obtained in step (A) is higher than the range described above, it is preferably adjusted by adding a dispersion medium. The concentration of the carbon nanotube aggregates described above can be determined from the amount of each component used, and when the concentration of the carbon nanotube aggregates is measured using a carbon nanotube paste or a dispersion liquid of carbon nanotubes, it can also be determined from the absorbance of the paste or dispersion liquid.

In step (B), the ultrasonic radiation output power in ultrasonic dispersion treatment varies depending on the treatment amount and dispersion time, and is preferably 20 to 1,000 W. For a high dispersion with the least destruction of graphite structure of a carbon nanotube aggregate, it is preferable to adjust the radiation output power, dispersion time, or the like. For example, when the amount of dispersion treatment is not more than 20 mL, 20 to 50 W is preferred, and when the amount of dispersion treatment is 100 to 500 mL, 100 W to 400 W is preferred. By adjusting, e.g., reducing the dispersion time when the ultrasonic output power is large or increasing the dispersion time when the output power is small, the high dispersion with the least destruction of graphite structure of a carbon nanotube aggregate can be achieved, and deterioration of the properties of the carbon nanotube aggregate can be prevented. Specific preferred conditions of ultrasonication is such that the amount of ultrasonic irradiation determined from the following equation (1) is not more than 4.9 kW·min/g, more preferably 0.1 kW·min/g to 4 kW·min/g, and still more preferably 0.2 kW·min/g to 3 kW·min/g.

Amount of ultrasonic irradiation (kW·min/g)=Radiation output power (kW)×Dispersion time (min)/(Mass of dry carbon nanotube aggregates+Mass of dry dispersant) (g)　　(1)

In step (B), for the temperature at which carbon nanotube aggregates are dispersed, it is preferable to prevent the liquid temperature from rising, for example, by carrying out the dispersion with cooling by the continuous flow method so that the liquid temperature will not rise during the dispersion particularly in the case of high output power. The liquid temperature during the ultrasonic irradiation is preferably 0° C. to 50° C., more preferably 0° C. to 30° C., and still more preferably 0° C. to 20° C. In this range, carbon nanotubes and a dispersant stably interact, and high dispersion can be achieved. The frequency is preferably 20 to 100 kHz.

To exhibit the conductivity and thermal conductivity that a carbon nanotube intrinsically has, the carbon nanotube aggregates in a dispersion liquid of carbon nanotube aggregates of the present invention have an average length of not less than 2 μm and isolatedly dispersed, indicating isolated dispersion, preferably 2 μm to 6 μm, and still more preferably 2.5 μm to 5 μm.

After preparation of such a dispersion liquid of carbon nanotube aggregates, it is applied onto a substrate to thereby form a conductive film. The method of applying the dispersion liquid of carbon nanotube aggregates is not particularly limited. The concentration of the carbon nanotube aggregates in the dispersion liquid of carbon nanotube aggregates at the application is appropriately selected depending on the application method, and it is 0.001% by mass to 10% by mass. Known application methods such as spray painting, immersion coating, spin coating, knife coating, kiss coating, gravure coating, screen printing, ink jet printing, pad printing, other types of printing, roll coating, and the like can be utilized. The application may be performed as many times as necessary, and two different types of application methods may be combined. The most preferred application method is roll coating.

Although the coating thickness (wet thickness) of the dispersion liquid need not necessarily be defined as long as desired light transmittance and surface resistance can be obtained because it depends also on the concentration of a coating solution, it is preferably 0.1 μM to 50 μM and more preferably 1 μm to 20 μm.

When an aqueous dispersion liquid of carbon nanotube aggregates is applied onto a substrate, a wetting agent may be added into the dispersion liquid. When applying to a non-hydrophilic substrate, adding a wetting agent, particularly, a surfactant, alcohol, or the like into the dispersion liquid allows application of the dispersion liquid without being repelled by the substrate. Alcohols are preferred as a wetting agent, and methanol or ethanol is preferred among the alcohols. Lower alcohols such as methanol and ethanol can be readily removed when drying the substrate after the application because of their high volatility. A mixed solution of alcohol and water may optionally be used.

From the conductive film thus coated with the dispersion liquid of carbon nanotube aggregates, the unnecessary dispersion medium can be removed by means of, for example, air-drying, heating, or pressure reduction after applying the dispersion liquid to the substrate. Upon this removal, the carbon nanotube aggregates form a three-dimensional network structure and are immobilized on the substrate. Thereafter, the dispersant, a component in the liquid, is removed using an appropriate solvent. This operation facilitates dispersion of charges to improve the conductivity of the transparent conductive film.

The solvent for removing the dispersant described above is not particularly limited as long as it dissolves the dispersant and may be an aqueous solvent or a nonaqueous solvent. Specific examples include aqueous solvents such as water, alcohols, and acetonitrile and nonaqueous solvents such as chloroform and toluene.

After a transparent conductive film is formed by applying a dispersion liquid containing carbon nanotube aggregates to a substrate as described above, it is also preferable to overcoat this film with a binder material that is able to form an organic or inorganic transparent coating. The overcoating is effective for further dispersion and transfer of charges.

Alternatively, a transparent conductive film can also be obtained in such a manner that a binder material that is able to form an organic or inorganic transparent coating is incorporated into a dispersion liquid containing carbon nanotube aggregates; the resultant is applied to a substrate; and then, if necessary, the coated film is dried or printed (cured) by heating. The heating conditions at this time are set appropriately depending on the type of binder. When the binder is photo-curable or radiation-curable, the coated film is cured not by heat curing but by applying light or radiation to the coated film immediately after the coating. As the radiation, ionizable radiation such as electron ray, ultraviolet ray, X-ray, gamma ray, or the like can be used, and the radiation dose is determined depending on the type of binder.

The binder material described above is not particularly limited as long as it is one which is used for conductive coating, and various organic and inorganic binders, i.e., transparent organic polymers or precursors thereof (which hereinafter may be referred to as "organic polymeric binder") or inorganic polymers or precursors thereof (which hereinafter may be referred to as "inorganic polymeric binder") can be used. The organic polymeric binder may be thermoplastic, thermosetting, or curable by radiation such as ultraviolet ray and electron ray.

Examples of suitable organic binders include organic polymers such as polyolefins (e.g., polyethylene and polypropylene), polyamides (e.g., nylon 6, nylon 11, nylon 66, and nylon 6,10), polyesters (e.g., polyethylene terephthalate and polybutylene terephthalate), silicone resins, vinyl resins (e.g., polyvinyl chloride, polyvinylidene chloride, polyacrylonitrile, polyacrylate, polystyrene derivatives, polyvinyl acetate, and polyvinyl alcohol), polyketones, polyimides, polycarbonates, polysulfones, polyacetals, fluororesins, phenol resins, urea resins, melamine resins, epoxy resins, polyurethanes, cellulosic polymers, proteins (e.g., gelatin and casein), chitin, polypeptides, polysaccharides, and polynucleotides, and precursors (monomer or oligomer) of these polymers. These are able to form a transparent coating or matrix by simply evaporating a solvent or by heat curing or photoirradiation or radiation irradiation curing.

Preferred organic polymeric binders are compounds having an unsaturated bond that can be radical polymerization cured by radiation or light, and these are monomers, oligomers, or polymers having a vinyl group or a vinylidene group. Examples of such a kind of monomers include styrene derivatives (e.g., styrene and methylstyrene), acrylic acid or methacrylic acid or derivatives thereof (e.g., alkyl acrylate or methacrylate and allyl acrylate or methacrylate), vinyl acetate, acrylonitrile, itaconic acid, and the like.

The oligomer or polymer is preferably a compound having a double bond in the main chain or a compound having an acryloyl or methacryloyl group at both ends of the straight chain. These types of radical polymerization curable binders have high hardness and excellent abrasion resistance and are able to form a highly transparent coating or matrix.

Examples of inorganic polymeric binders include sol of metal oxide such as silica, tin oxide, aluminum oxide, zirconium oxide, and the like, and hydrolyzable or thermally-degradable organic metal compounds (e.g., organic phosphorus compounds, organic boron compounds, organic silane compounds, organic titanium compounds, organic zirconium compounds, organic lead compounds, and organic alkaline earth metal compounds) which are a precursor of an inorganic polymer. Specific examples of hydrolyzable or thermally-degradable organic metal compounds include alkoxides or partial hydrolysate thereof, lower carboxylates such as acetate, and metal complexes, for example, of acetyl acetone.

If these inorganic polymeric binders are burnt, a glassy inorganic polymeric transparent coating or matrix comprising oxide or composite oxide can be formed. The inorganic polymeric matrix is generally glassy and has high hardness and excellent abrasion resistance as well as high transparency.

The amount of the binder used may be an amount sufficient for overcoating or, when formulated in a liquid, an amount sufficient to provide a viscosity suitable for coating. When it is too small, the coating is not performed successfully, and when it is too large, the conductivity is inhibited.

As a dispersion medium used in the present invention, the solvent as mentioned above is generally used, but in the case of photo-curable or radiation-curable organic polymeric binders, a solventless dispersion can be obtained by selecting a binder that is liquid at normal temperature. This significantly shortens the curing time because evaporation of a solvent will not occur when cure-drying a coating and eliminates the need of solvent recovery operation.

To the dispersion liquid of carbon nanotube aggregates of the present invention, additives such as a coupling agent, cross-linking agent, stabilizer, anti-settling agent, coloring agent, charge adjusting adjust, and lubricant can be added as required In addition, the dispersion liquid of carbon nanotube aggregates of the present invention can further contain a conductive organic material or a conductive inorganic material other than the carbon nanotube aggregate of the present invention, or a combination of these materials.

Examples of conductive organic materials that can be used include buckyball, carbon black, fullerene, various carbon nanotubes, and particles containing the same; organic acids such as sulfonic acid; and organic compounds having an acceptor structure in their molecule, such as tetracyanoquinodimethane (TCNQ), trinitrofluorenone (TNF), chloranil, and the like.

Examples of conductive inorganic materials include aluminum, antimony, beryllium, cadmium, chromium, cobalt, copper, doped metal oxide, iron, gold, lead, manganese, magnesium, mercury, metal oxide, nickel, platinum, silver, steel, titanium, zinc, and particles containing the same. Preferred examples include indium tin oxide, antimony tin oxide, and mixtures thereof.

A film obtained by incorporation or overcoating of these conductive materials is very advantageous for dispersion or transfer of charges. Further, a layer comprising such a conductive material other than the carbon nanotube aggregate and a layer comprising the carbon nanotube aggregate may be laminated.

The material of the substrate of the conductive film obtained by applying the dispersion liquid of carbon nanotube aggregates of the present invention to a film substrate is not particularly limited, and examples thereof include resin, glass, and the like. Examples of resins include polyesters such as polyethylene terephthalate (PET) and polyethylene naphthalate (PEN), polycarbonate (PC), polymethyl methacrylate (PMMA), polyimide, polyphenylene sulfide, aramid, polypropylene, polyethylene, polylactic acid, polyvinyl chloride, polymethyl methacrylate, alicyclic acrylic resin, cycloolefin resin, triacetylcellulose, and the like. As the glass, normal soda glass can be used. Further, a plurality of such substrates can be used in combination. For example, a composite substrate such as a substrate obtained by combining resin and glass or a substrate obtained by laminating two or more resins may be used. Those obtained by providing a resin film with a hard coating may be used. Further, a film obtained by subjecting such a film to hydrophilizing treatment such as corona treatment may be used. Furthermore, a film obtained by providing such a film with an undercoat layer may be used. The material of the undercoat layer is preferably a material with high hydrophilicity. Specifically, it is preferable to use an inorganic oxide. More preferred are titania, alumina, and silica. These materials are preferred because they have a hydroxyl group, a hydrophilic group, on their surface and provide high hydrophilicity. Further, the undercoat layer may be a complex of such an inorganic oxide and a resin, and examples thereof include a complex of silica fine particles and polysilicate.

The conductive film obtained as described above can be used as adhered to the substrate and also can be used as an independent film peeled off from the substrate. The independent film can be produced, for example, by applying an organic polymeric binder further onto a transparent conductive film and then peeling off the substrate. Further, the substrate at the production can be burnt off or molten by thermal decomposition, and another substrate can be used after transcribing a transparent conductive film thereto. In this case, the thermal decomposition temperature of the substrate at the production is preferably lower than the thermal decomposition temperature of the transcribed substrate.

The conductive film obtained as described above can have a thickness in various ranges. For example, the conductive film can have a thickness of about 0.5 nm to about 1,000 μm, preferably about 0.005 to about 1,000 μm, more preferably about 0.05 to about 500 μM, still more preferably about 1.0 to about 200 μm, and particularly preferably about 1.0 to about 50 μm.

The conductive film obtained as described above can also be a conductive film having a light transmittance of 85% or more and a surface resistance of less than $1\times10^5\Omega/\square$ in which carbon nanotube aggregates is laminated on a substrate.

For the transmittance of the conductive film, preferably, transmittance of conductive film/light transmittance of transparent substrate>0.85, and more preferably, 0.99 >transmittance of conductive film/light transmittance of transparent substrate>0.90. The surface resistance of the conductive film is more preferably less than $1\times10^4\Omega/\square$ and still more preferably less than $5\times10^3\Omega/\square$.

Further, it is more preferred that the ratio of 550 nm light transmittance of transparent electric conductor/550 nm light transmittance of transparent substrate be 80% or more and that the surface resistance be $10^0$ to $10^4\Omega/\square$. By employing a preferred embodiment in the present invention, such a conductive film can be obtained. In this range, the conductive film can preferably be used as a substrate provided with a transparent conductive film, for example, in touch panel, liquid crystal display, organic electroluminescence, and electronic paper. Namely, when the surface resistance is not less than $1\times10^0\Omega/\square$, the above-described substrate with high transmittance and reduced electricity consumption can be obtained, and when it is not more than $1\times10^4\Omega/\square$, the influence of errors on the above-described coordinate reading of a touch panel can be reduced.

EXAMPLES

The present invention will now be specifically described by way of example.
(Measurement of Weight Average Molecular Weight of Dispersant)

For the weight average molecular weight of a dispersant, using gel permeation chromatography, the molecular weight was calculated with the apparatus and under conditions below by comparing with a calibration curve using polyethylene glycol.

Apparatus: LC-10A Series manufactured by Shimadzu Corporation
Column: GF-7M HQ available from SHOWA DENKO K.K.
Mobile phase: 10 mmol/L aqueous lithium bromide solution
Flow rate: 1.0 mL/min
Detection: Differential refractometer
Column temperature: 25° C.
(Evaluation of Carbon Nanotube Aggregate)
[Thermal Analysis]

About 1 mg of samples was placed in a differential thermal analyzer (DTG-60 manufactured by Shimadzu Corporation), and the temperature was raised from room temperature to 900° C. at an air supply of 50 mL/min and a temperature rise rate of 10° C./min. From the DTA curve at this time, a peak combustion temperature derived from heat generation was read out.
[Raman Spectroscopic Analysis]

A powder sample was placed in a resonance Raman spectrometer (INF-300 manufactured by HORIBA Jobin Yvon), and measurements were made using a laser wavelength of 633 nm. In the measurement of a G/D ratio, analysis was performed at three different points of the sample, and the arithmetic mean was determined.
[High-Resolution Transmission Electron Micrograph]

One mg of carbon nanotube aggregates was placed into 1 mL of ethanol, and a dispersion treatment was performed for about 15 min using an ultrasonic bath. A few drops of the dispersed sample were added dropwise on a grid and dried. The grid onto which the sample was thus applied was placed on a transmission electron microscope (manufactured by JEOL Ltd., JEM-2100), and measurements were made. The measuring magnification was 50,000× to 500,000×, and observations of the outer diameter distribution and layer-number distribution of a carbon nanotube were carried out at 400,000×. The accelerating voltage is 120 kV.
(Evaluation of Carbon Nanotube Paste)
[The Amount of Dispersant Adsorption to Carbon Nanotube Paste]

When carboxymethylcellulose or a derivative thereof, or a salt thereof was used as a dispersant, evaluation was performed by the following method.

A carbon nanotube paste was subjected to centrifugal separator treatment at 10,000 G for 15 min to be separated into an aqueous layer and a precipitate layer, and 0.1 g of the precipitate was washed with water into a 5-mL measuring flask, which was made up to 5 mL. To the sample above, an anthrone-sulfuric acid test solution (a solution obtained in such a manner that 66 mL of sulfuric acid was added into 34 mL of water; after cooling the resultant, 50 mg of anthrone was added and dissolved; and then 1 g of thiourea was added and dissolved) was added, and the resulting mixture was heated in a boiling bath for 10 min and then rapidly cooled in cold water. Thereafter, the resultant was separated into carbon nanotube aggregate and supernatant by centrifugal separator treatment, and the absorbance of the supernatant at 620 nm was measured. The absorbance was plotted on a calibration curve constructed from the absorbance of standard diluent to determine the content of the dispersant in the precipitate. The amount of dispersant adsorption to the carbon nanotube paste was evaluated by determining the mass % of this content based on the total mass of the dispersant added.

[Particle Size of Carbon Nanotube Aggregates in Carbon Nanotube Paste]

A carbon nanotube paste was diluted with ion exchanged water such that carbon nanotube aggregates are contained in an amount of 0.03 mg/mL; particle size measurements were made three times using a particle size analyzer (manufactured by OTSUKA ELECTRONICS CO., LTD., ELS-Z2); and the average particle size was employed.

(Evaluation of Dispersion Liquid of Carbon Nanotubes)

[Measurement of Average Diameter of Dispersed Carbon Nanotubes]

A liquid to be measured in which carbon nanotube aggregates are dispersed is adjusted to have a carbon nanotube concentration of 0.003% by mass, and this liquid to be measured in an amount of 30 μL was placed on a mica substrate and spin-coated at a revolution speed of 3,000 rpm for 60 seconds, after which diameters of 100 random dispersed carbon nanotubes were measured using an AFM (manufactured by Shimadzu Corporation, SPM9600M) and arithmetically averaged to calculate the average diameter.

[Measurement of Length of Dispersed Carbon Nanotubes]

For a dispersion liquid of carbon nanotubes adjusted to have a carbon nanotube concentration of 0.003% by mass, this liquid to be measured in an amount of 30 μL was placed on a mica substrate and spin-coated at a revolution speed of 3,000 rpm for 60 seconds. Thereafter, when the diameter of dispersed carbon nanotubes was not more than the above-described average diameter measured under a transmission electron microscope, the carbon the nanotube were considered to be isolated, and only in such cases, a carbon nanotube length was measured using an AFM (manufactured by Shimadzu Corporation, SPM9600M).

(Evaluation of Transparent Conductive Film Coated with Dispersion Liquid of Carbon Nanotubes)

[Production of Transparent Conductive Film]

A dispersion liquid of carbon nanotube aggregates having a carbon nanotube concentration of 0.08% by mass was prepared and applied onto a corona-treated polyethylene terephthalate (PET) film (available from TORAY INDUSTRIES, INC. ("Lumirror" (registered trademark) U46), light transmittance: 91%, 15 cm×10 cm) using a bar coater, and the coated film was dried in a drier at 120° C. for 1 min to immobilize the carbon nanotube aggregates.

[Measurement of Light Transmittance]

For a light transmittance, the film coated with carbon nanotube aggregates was loaded into a spectrophotometer (U-2100 manufactured by Hitachi Ltd.), and a light transmittance at a wavelength of 550 nm was measured.

[Surface Resistance Measurement]

A surface resistance was measured using Loresta EP MCP-T360 (manufactured by DIA INSTRUMENTS CO., LTD.) using the four-terminal four-probe method in accordance with JIS K 7149 (established in December 1994). In high-resistance measurement, measurements were made using Hiresta UP MCP-HT450 (manufactured by DIA INSTRUMENTS CO., LTD., 10 V, 10 seconds).

Production Example 1

Preparation of Carbon Nanotube Aggregate

[Catalyst Preparation Example: Support of Catalytic Metal Salt on Magnesia]

Ferric ammonium citrate (available from Wako Pure Chemical Industries, Ltd.) in an amount of 2.46 g was dissolved in 500 mL of methanol (available from KANTO KAGAKU). To this solution, 100.0 g of magnesium oxide (MJ-30 available from Iwatani Chemical Industry Co., Ltd.) was added, and the resulting mixture was vigorously stirred with a stirrer for 60 min. The suspension was concentrated to dryness at 40° C. under reduced pressure. The powder obtained was dried by heating at 120° C. to remove methanol, thereby obtaining a catalyst body, a metal salt-supported magnesium oxide (hereinafter referred to as MgO) powder. While granulating the resultant solid matter with a mortar on a sieve, those with a particle size in the range of 20 to 32 mesh (0.5 to 0.85 mm) were recovered. The iron content contained in the catalyst body obtained was 0.38% by mass. The bulk density was 0.61 g/mL. The operation described above was repeated, and the following experiment was performed.

[Carbon Nanotube Aggregate Production Example: Synthesis of Carbon Nanotube Aggregate]

Figure 2:
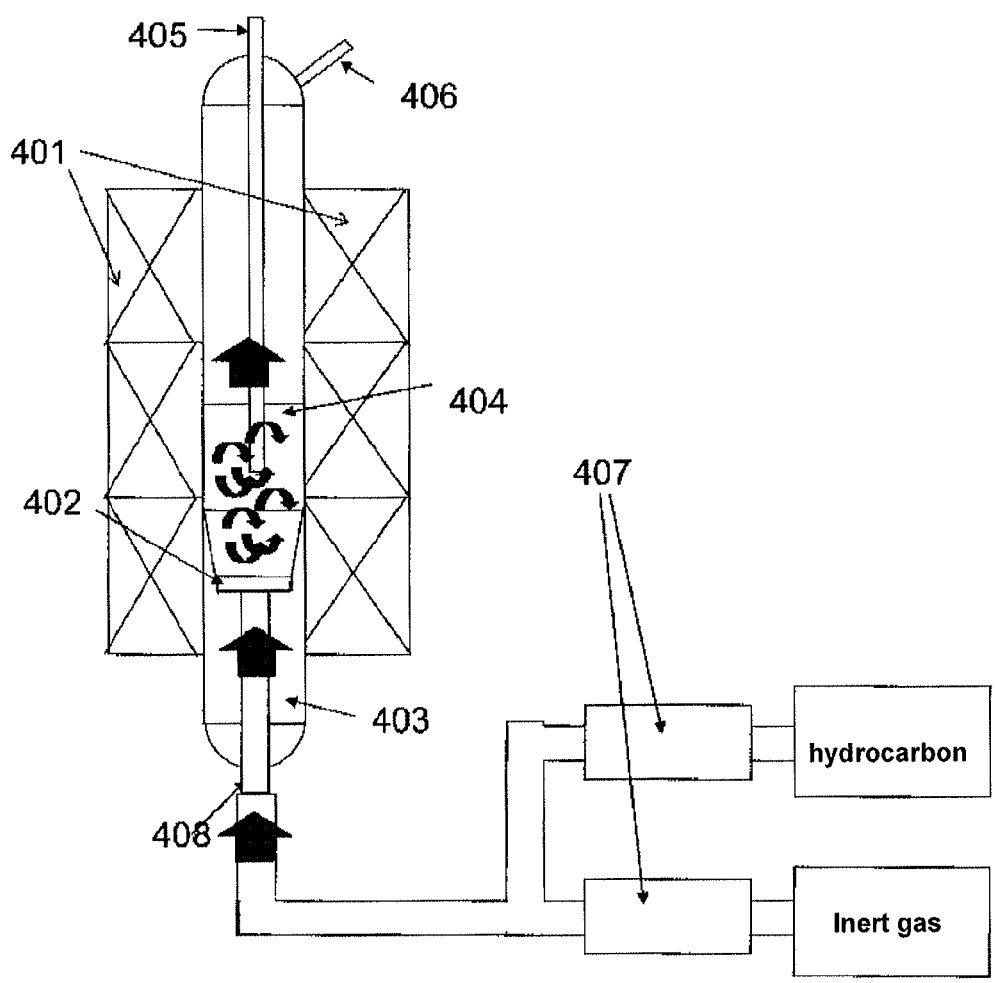
FIG. 2 is a schematic view of an apparatus for chemical vapor deposition used in Production Example 1.

The apparatus shown in FIG. 2 was used to synthesize a carbon nanotube. A reactor 403 is a cylindrical quartz tube with an inner diameter to 75 mm and a length of 1,100 mm. The apparatus comprises a quartz sintered plate 402 at the central part; a mixed gas-introduction tube 408, an inert gas and raw gas supply line, at the lower part of the quartz tube; and a waste gas pipe 406 at the upper part. Further, the apparatus comprises three electric furnaces 401 as a heater surrounding the circumference of the reactor so that the reactor can be kept at any temperature. In addition, the apparatus comprises a thermocouple 405 in order to detect the temperature in a reaction tube.

The solid catalyst body prepared in Catalyst Preparation Example was weighed in an amount of 132 g and introduced onto the quartz sintered plate at the central part of the vertically arranged reactor to form a catalyst layer 404. While heating the catalyst body layer until the temperature in the reaction tube reached about 860° C., nitrogen gas was supplied at 16.5 L/min from the bottom of the reactor toward the upper part of the reactor using a mass flow controller 407 and distributed so as to pass through the catalyst body layer. Thereafter, while supplying nitrogen gas, methane gas was further introduced at 0.78 L/min for 60 min using the mass flow controller 407 and passed so as to pass through the catalyst body layer for reaction. At this time, the contact time obtained by dividing the weight of the solid catalyst body by the flow rate of methane (W/F) was 169 min·g/L, and the linear velocity of the gas including methane was 6.55 cm/sec. The introduction of methane gas was stopped, and the quartz reaction tube was cooled to room temperature while passing nitrogen gas at 16.5 L/min.

The heating was stopped, and the reactor was left to stand to room temperature. After room temperature was reached, a carbon nanotube-containing composition containing the catalyst body and carbon nanotubes was taken out of the reactor.

[Purification and Oxidation Treatment of Carbon Nanotube Aggregate 1]

The carbon nanotube-containing composition containing the catalyst body and carbon nanotubes obtained in Carbon Nanotube Aggregate Production Example in an amount of 118 g was transferred to an evaporating dish, allowed to stand in an electric furnace heated in advance to a preset temperature of 446° C., and oxidized by heating for 3 hours.

The carbon nanotube-containing composition obtained as described above was used for stirring in a 4.8 N aqueous hydrochloric acid solution for 1 hour, thereby dissolving the catalytic metal iron and its carrier MgO. The black suspension obtained was filtered, and then the recovered filtrate was poured again into a 4.8 N aqueous hydrochloric acid solution for de-MgO treatment and recovered by filtration.

This operation was repeated three times (de-MgO treatment). The carbon nanotube-containing filtrate finally obtained was dried by heating at 120° C. overnight to obtain 0.374 g of a carbon nanotube-containing composition.

To the dry weight content of the carbon nanotube-containing composition obtained, about 300 times weight of concentrated nitric acid (available from Wako Pure Chemical Industries, Ltd., extra-pure, Assay 60 to 61%) was added. Thereafter, the resulting mixture was heated to reflux in an oil bath at about 140° C. with stirring for 5 hours. After the heating to reflux, the nitric acid solution containing the carbon nanotube-containing composition was 3-fold diluted with ion exchanged water and suction-filtered. After washing with ion exchanged water until the suspension of the recovered filtrate became neutral, a wet carbon nanotube aggregate 1 containing water was obtained. At this time, the total weight of the wet carbon nanotube aggregate 1 containing water was 4.651 g (concentration of the carbon nanotube-containing composition: 7.47% by mass).

The wet carbon nanotube aggregate 1 obtained was diluted with ion exchanged water such that carbon nanotube aggregates were contained in an amount of 0.03 mg/mL, and particle size measurements were attempted three times using a particle size analyzer (manufactured by OTSUKA ELECTRONICS CO., LTD., ELS-Z2); however, the particle size could not be measured because the carbon nanotube aggregates immediately sedimented.

[Thermal Analysis of Carbon Nanotube Aggregate 1]

The thermal analysis of the carbon nanotube aggregate 1 obtained was carried out. The peak combustion temperature was 739° C.

[High-Resolution Transmission Electron Microscopic Analysis of Carbon Nanotube Aggregate 1]

Figure 3:
FIG. 3 is a high-resolution transmission electron micrograph of the carbon nanotube aggregates obtained in Production Example 1.

The carbon nanotube aggregate 1 obtained as described above was observed under a high-resolution transmission electron microscope; as shown in FIG. 3, the carbon nanotubes were formed by regular graphite layers, and carbon nanotubes of two layers were observed. The carbon nanotubes of two layers accounted for 80% or more (88 in number) of 100 carbon nanotubes. Carbon nanotubes of three layers or more accounted for 10% or less (7 in number). For 100 carbon nanotubes arbitrarily selected, outer diameters of the carbon nanotubes was measured, and the arithmetic mean value was 1.7 nm.

[Resonance Raman Spectroscopic Analysis of Carbon Nanotube Aggregate 1]

The carbon nanotube aggregate 1 obtained as described above was measured by Raman spectrometry. As a result, the G/D ratio in the Raman spectroscopic analysis at a wavelength of 633 nm was 35, and it was proved to be a high-quality double-walled carbon nanotube with a high degree of graphitization.

[Volume Resistivity Measurement of Carbon Nanotube Aggregate 1]

The carbon nanotube aggregate 1 (20 mg) obtained as described above was mixed with 16 mL of N-methylpyrrolidone, and the resulting mixture was subjected to ultrasonic irradiation using an ultrasonic homogenizer at 20 W for 20 min, then mixed with 10 mL of ethanol, and suction-filtered using a filtering machine with an inner diameter of 35 mm; this recovered filtrate was dried in a drier at 60° C. for 2 hours together with the filtering machine and the filter used for filtration. The carbon nanotube film obtained was measured with Loresta EP MCP-T360 (manufactured by DIA INSTRUMENTS CO., LTD.) using the four-terminal four-probe method in accordance with JIS K 7149, and a volume resistivity was calculated to be $4.4 \times 10^{-4}$ Ω·cm.

Production Example 2

Purification and Oxidation Treatment of Carbon Nanotube Aggregate 2

The carbon nanotube-containing composition containing the catalyst body and carbon nanotubes obtained in Carbon Nanotube Aggregate Production Example in an amount of 130 g was used for stirring in a 4.8 N aqueous hydrochloric acid solution in an amount of 2,000 mL for 1 hour, thereby dissolving the catalytic metal iron and its carrier MgO. The black suspension obtained was filtered, and then the recovered filtrate was poured again into a 4.8 N aqueous hydrochloric acid solution in an amount of 400 mL for de-MgO treatment and recovered by filtration. This operation was repeated three times (de-MgO treatment). Thereafter, after washing with ion exchanged water until the suspension of the recovered filtrate became neutral, the carbon nanotube-containing composition was stored in the wet state containing water. At this time, the total weight of the wet carbon nanotube-containing composition containing water was 102.7 g (concentration of the carbon nanotube-containing composition: 3.12% by mass).

To the dry weight content of the wet carbon nanotube-containing composition obtained, about 300 times weight of concentrated nitric acid (available from Wako Pure Chemical Industries, Ltd., extra-pure, Assay 60 to 61%) was added. Thereafter, the resulting mixture was heated to reflux in an oil bath at about 140° C. with stirring for 25 hours. After the heating to reflux, the nitric acid solution containing the carbon nanotube-containing composition was 3-fold diluted with ion exchanged water and suction-filtered. After washing with ion exchanged water until the suspension of the recovered filtrate became neutral, a wet carbon nanotube aggregate 2 containing water was obtained. At this time, the total weight of the wet carbon nanotube composition containing water was 3.351 g (concentration of the carbon nanotube-containing composition: 5.29 wt %).

The wet carbon nanotube aggregate 2 obtained was diluted with ion exchanged water such that carbon nanotube aggregates were contained in an amount of 0.03 mg/mL, and particle size measurements were attempted three times using a particle size analyzer (manufactured by OTSUKA ELECTRONICS CO., LTD., ELS-Z2); however, the particle size could not be measured because the carbon nanotube aggregates immediately sedimented.

[Thermal Analysis of Carbon Nanotube Aggregate 2]

The thermal analysis of the carbon nanotube aggregate 2 obtained was carried out. The peak combustion temperature was 751° C.

[High-Resolution Transmission Electron Microscopic Analysis of Carbon Nanotube Aggregate 2]

The carbon nanotube aggregate 2 obtained as described above was observed under a high-resolution transmission electron microscope; the carbon nanotubes were formed by regular graphite layers, and carbon nanotubes of two layers were observed. The carbon nanotubes of two layers accounted for 80% or more (91 in number) of 100 carbon nanotubes. Carbon nanotubes of three layers or more accounted for 10% or less (5 in number). For 100 carbon nanotubes arbitrarily selected, outer diameters of the carbon nanotubes was measured, and the arithmetic mean value was 1.7 nm.

[Resonance Raman Spectroscopic Analysis of Carbon Nanotube Aggregate 2]

The carbon nanotube aggregate 2 obtained as described above was measured by Raman spectrometry. As a result, the G/D ratio in the Raman spectroscopic analysis at a wavelength of 633 nm was 43, and it was proved to be a high-quality double-walled carbon nanotube with a high degree of graphitization.

[Volume Resistivity Measurement of Carbon Nanotube Aggregate 2]

The carbon nanotube aggregate 2 (20 mg) obtained as described above was mixed with 16 mL of N-methylpyrrolidone, and the resulting mixture was subjected to ultrasonic irradiation using an ultrasonic homogenizer at 20 W for 20 min, then mixed with 10 mL of ethanol, and suction-filtered using a filtering machine with an inner diameter of 35 mm; this recovered filtrate was dried in a drier at 60° C. for 2 hours together with the filtering machine and the filter used for filtration. The carbon nanotube film obtained was measured with Loresta EP MCP-T360 (manufactured by DIA INSTRUMENTS CO., LTD.) using the four-terminal four-probe method in accordance with JIS K 7149, and a volume resistivity was calculated to be $3.9 \times 10^{-4}$ Ω·cm.

[Undercoat Layer Preparation Example]

Using polysilicate as a binder, a hydrophilic silica undercoat layer with silica fine particles with a diameter of 30 nm appearing on the surface was prepared by the following procedure.

Mega Aqua Hydrophilic DM Coat (available from Ryowa Corporation, DM-30-26G-N1) which contains hydrophilic silica fine particles of about 30 nm and polysilicate in an amount of 1% by mass in terms of solids concentration was used as a coating solution for producing a silica film.

Using a wire bar #8, the coating solution for producing a silica film described above was applied onto a polyethylene terephthalate (PET) film (available from TORAY INDUSTRIES, INC. ("Lumirror" (registered trademark) U46), and then dried in a drier at 120° C. for 1 min.

[Overcoat Layer Preparation Example]

In a 100-mL plastic container, 20 g of ethanol was placed and 40 g of n-butyl silicate was added thereto, and the resultant was stirred for 30 min. Thereafter, 10 g of 0.1 N aqueous hydrochloric acid solution was added thereto, and then the resultant was stirred for 2 hours and allowed to stand at 4° C. for 12 hours. This solution was diluted with a mixed solution of toluene, isopropyl alcohol, and methyl ethyl ketone to a solids concentration of 1% by mass.

This coating solution was applied onto a carbon nanotube layer using a wire bar #8 and then dried in a 125° C. drier for 1 min.

Example 1

The wet carbon nanotube aggregate 1 obtained (25 mg in terms of dry weight), 2.5 g of an aqueous solution of 1% by mass sodium carboxymethylcellulose (available from DAICEL FINECHEM LTD., "DAICEL" (registered trademark) 1140 (weight average molecular weight: 450,000)), and 6.7 g of zirconia beads (available from TORAY INDUSTRIES, INC., "Torayceram" (registered trademark), bead size: 0.8 mm) were added into a container, and the pH was adjusted to 10 using a 28% aqueous ammonia solution (available from Kishida Chemical Co., Ltd.). This container was shaken for 2 hours using a vibratory ball mill (manufactured by IRIE SHOKAI Co., Ltd., VS-1, vibration frequency: 1,800 cpm (60 Hz)) to prepare a carbon nanotube paste; the amount of dispersant adsorption to this carbon nanotube paste was 88%, and the particle size was 3.5 μm.

This carbon nanotube paste was then diluted with ion exchanged water to a carbon nanotube concentration of 0.15% by mass, and 10 g of the resultant diluent was adjusted to have a pH of 10 with a 28% aqueous ammonia solution again. The resultant aqueous solution was subjected to a dispersion treatment under ice-cooling using an ultrasonic homogenizer (manufactured by IEDA TRADING Corporation, VCX-130) at an output power of 20 W for 1.5 min (1 k·min/g). During the dispersion, the liquid temperature was maintained at 10° C. or lower. The resultant solution was subjected to a centrifugal separator treatment at 10,000 G for 15 min using a high-speed centrifuge (TOMY SEIKO CO., LTD., MX-300) to obtain 9 g of a dispersion liquid of carbon nanotubes. The average diameter of the dispersed carbon nanotubes in this dispersion liquid when measured with an AFM was 1.8 nm, indicating isolated dispersion. The length of the dispersed carbon nanotubes was 2.6 μm.

Thereafter, water was added to a final carbon nanotube aggregate concentration of 0.08% by mass to prepare a film coating solution. This coating solution was applied onto a corona-treated polyethylene terephthalate (PET) film (available from TORAY INDUSTRIES, INC. ("Lumirror" (registered trademark) U46), light transmittance: 90.4%, 15 cm×10 cm) using a bar coater, dried in air, and then dried in a 120° C. drier for 1 min to immobilize the carbon nanotube composition. The surface resistance of the conductive film obtained was $5.5 \times 10^2$ Ω/□, and the light transmittance was 87.0% (transparent conductive film 87.0%/PET film 90.4%=0.96).

Example 2

A paste was prepared in the same manner as in Example 1 except that a single-walled carbon nanotube (available from Meijo Nano Carbon Co., Ltd., SWNT FH-P, average diameter: 2.5 nm) was used for a carbon nanotube aggregate; the amount of dispersant adsorption to this carbon nanotube paste was 89%, and the particle size was 3.9 μm.

A dispersion liquid of carbon nanotubes was then prepared using this paste in the same manner as in Example 1; the average diameter of the dispersed carbon nanotubes in this dispersion liquid when measured with an AFM was 2.6 nm, indicating isolated dispersion. The length of the dispersed carbon nanotubes was 2.4 μm.

Thereafter, a conductive film was prepared in the same manner as in Example 1; the surface resistance was 650Ω/□, and the light transmittance was 87.0% (transparent conductive film 87.0%/PET film 90.4%=0.96).

Example 3

A paste was prepared in the same manner as in Example 1 except that zirconia beads with a bead diameter of 1,500 μm were used; the amount of dispersant adsorption to this carbon nanotube paste was 89%, and the particle size was 3.0 μm.

A dispersion liquid of carbon nanotubes was then prepared using this paste in the same manner as in Example 1; the average diameter of the dispersed carbon nanotubes in this dispersion liquid when measured with an AFM was 1.5 nm, indicating isolated dispersion. The length of the dispersed carbon nanotubes was 2.5 μm.

Thereafter, a conductive film was prepared in the same manner as in Example 1; the surface resistance was 600Ω/□, and the light transmittance was 87.0% (transparent conductive film 87.0%/PET film 90.4%=0.96).

Example 4

A conductive film was prepared in the same manner as in Example 3 except that the film coating solution was applied onto a polyethylene terephthalate (PET) film (available from TORAY INDUSTRIES, INC. ("Lumirror" (registered trademark) U46) provided with an undercoat layer in accordance with Undercoat Layer Preparation Example and in the same manner as in Example 2 except that an overcoat layer was provided on a carbon nanotube layer in accordance with Overcoat Layer Preparation Example; the surface resistance was 900Ω/□, and the light transmittance was 90.0%.

Example 5

The wet carbon nanotube aggregate 2 obtained (25 mg in terms of dry weight), 1.0 g of an aqueous solution of 6% by mass sodium carboxymethylcellulose (available from DAI-ICHI KOGYO SEIYAKU CO., LTD., "CELLOGEN" (registered trademark) 5 A (weight average molecular weight: 80,000)), 0.8 g of ion exchanged water, 13.3 g of zirconia beads (available from TORAY INDUSTRIES, INC., "Torayceram" (registered trademark), bead size: 0.8 mm) Were added into a container, and the pH was adjusted to 10 using a 28% aqueous ammonia solution (available from Kishida Chemical Co., Ltd.). This container was shaken for 2 hours using a vibratory ball mill (manufactured by IRIE SHOKAI Co., Ltd., VS-1, vibration frequency: 1,800 cpm (60 Hz)) to prepare a carbon nanotube paste; the amount of dispersant adsorption to this carbon nanotube paste was 88%, and the particle size was 4.0 μm.

This carbon nanotube paste was then diluted with ion exchanged water to a carbon nanotube concentration of 0.15% by mass, and 10 g of the resultant diluent was adjusted to have a pH of 10 with a 28% aqueous ammonia solution again. The resultant aqueous solution was subjected to a dispersion treatment under ice-cooling using an ultrasonic homogenizer (manufactured by IEDA TRADING Corporation, VCX-130) at an output power of 20 W for 1.5 min (0.6 kW·min/g). During the dispersion, the liquid temperature was maintained at 10° C. or lower. The resultant solution was subjected to a centrifugal separator treatment at 10,000 G for 15 min using a high-speed centrifuge (TOMY SEIKO CO., LTD., MX-300) to obtain 9 g of a dispersion liquid of carbon nanotubes. The average diameter of the dispersed carbon nanotubes in this dispersion liquid when measured with an AFM was 1.7 nm, indicating isolated dispersion. The length of the dispersed carbon nanotubes was 2.8 μm.

Thereafter, water was added to a final carbon nanotube aggregate concentration of 0.08% by mass to prepare a film coating solution. In accordance with Undercoat Layer Preparation Example, the film coating solution was applied onto a polyethylene terephthalate (PET) film (available from TORAY INDUSTRIES, INC. ("Lumirror" (registered trademark) U46), light transmittance: 90.4%, 15 cm×10 cm) provided with an undercoat layer. This coating solution was applied and dried in air, and then dried in a 120° C. drier for 1 min to immobilize the carbon nanotube composition. In accordance with Overcoat Layer Preparation Example, an overcoat layer was provided on a carbon nanotube layer to prepare a conductive film; the surface resistance was 600Ω/□, and the light transmittance was 90.0%.

Example 6

A paste was prepared in the same manner as in Example 5 except that the amount of the aqueous solution of 6% by mass sodium carboxymethylcellulose (available from DAI-ICHI KOGYO SEIYAKU CO., LTD., "CELLOGEN" (registered trademark) 5 A (weight average molecular weight: 80,000)) was 1.25 g; the amount of dispersant adsorption to this carbon nanotube paste was 89%, and the particle size was 3.9 μm.

A dispersion liquid of carbon nanotubes was then prepared using this paste in the same manner as in Example 5 (0.5 kW·min/g); the average diameter of the dispersed carbon nanotubes in this dispersion liquid when measured with an AFM was 1.7 nm, indicating isolated dispersion. The length of the dispersed carbon nanotubes was 2.7 μm.

Thereafter, a conductive film was prepared in the same manner as in Example 5; the surface resistance was 600Ω/□, and the light transmittance was 90.0%.

Example 7

A paste was prepared in the same manner as in Example 5 except that the amount of the aqueous solution of 6% by mass sodium carboxymethylcellulose (available from DAI-ICHI KOGYO SEIYAKU CO., LTD., "CELLOGEN" (registered trademark) 5 A (weight average molecular weight: 80,000)) was 2.5 g; the amount of dispersant adsorption to this carbon nanotube paste was 87%, and the particle size was 4.1 μm.

A dispersion liquid of carbon nanotubes was then prepared using this paste in the same manner as in Example 5 (0.3 kW·min/g); the average diameter of the dispersed carbon nanotubes in this dispersion liquid when measured with an AFM was 1.6 nm, indicating isolated dispersion. The length of the dispersed carbon nanotubes was 2.8 μm.

Thereafter, a conductive film was prepared in the same manner as in Example 5; the surface resistance was 650Ω/□, and the light transmittance was 90.0%.

Example 8

A paste was prepared in the same manner as in Example 5 except that sodium carboxymethylcellulose available from DAI-ICHI KOGYO SEIYAKU CO., LTD., "CELLOGEN" (registered trademark) 7 A (weight average molecular weight: 190,000) was used; the amount of dispersant adsorption to this carbon nanotube paste was 89%, and the particle size was 5.0 μm.

A dispersion liquid of carbon nanotubes was then prepared using this paste in the same manner as in Example 5 (0.6 kW·min/g); the average diameter of the dispersed carbon nanotubes in this dispersion liquid when measured with an AFM was 1.7 nm, indicating isolated dispersion. The length of the dispersed carbon nanotubes was 2.8 μm.

Thereafter, a conductive film was prepared in the same manner as in Example 5; the surface resistance was 600Ω/□, and the light transmittance was 90.0%.

Example 9

A paste was prepared in the same manner as in Example 5 except that sodium carboxymethylcellulose available from DAICEL FINECHEM LTD., "DAICEL" (registered trademark) 1110 (weight average molecular weight: 250,000) was used; the amount of dispersant adsorption to this carbon nanotube paste was 89%, and the particle size was 4.0 μm.

A dispersion liquid of carbon nanotubes was then prepared using this paste in the same manner as in Example 5 (0.6 kW·min/g); the average diameter of the dispersed carbon nanotubes in this dispersion liquid when measured with an AFM was 1.8 nm, indicating isolated dispersion. The length of the dispersed carbon nanotubes was 2.6 μm.

Thereafter, a conductive film was prepared in the same manner as in Example 5; the surface resistance was 700Ω/□, and the light transmittance was 90.0%.

Example 10

The wet carbon nanotube aggregate 2 obtained (2 mg in terms of dry weight), 83.3 g of an aqueous solution of 6% by mass sodium carboxymethylcellulose (available from DAI-ICHI KOGYO SEIYAKU CO., LTD., "CELLOGEN" (registered trademark) 5 A (weight average molecular weight: 80,000)), 62 g of ion exchanged water, 1,064 g of zirconia beads (available from TORAY INDUSTRIES, INC., "Torayceram" (registered trademark), bead size: 0.8 mm) were added into a container, and the pH was adjusted to 10 using a 28% aqueous ammonia solution (available from Kishida Chemical Co., Ltd.). This container was shaken for 2 hours using a vibratory ball mill (manufactured by IRIE SHOKAI Co., Ltd., VS-1, vibration frequency: 1,800 cpm (60 Hz)) to prepare a carbon nanotube paste; the amount of dispersant adsorption to this carbon nanotube paste was 88%, and the particle size was 4.0 μm.

This carbon nanotube paste was then diluted with ion exchanged water to a carbon nanotube concentration of 0.15% by mass, and 10 g of the resultant diluent was adjusted to have a pH of 10 with a 28% aqueous ammonia solution again. The resultant aqueous solution was subjected to a dispersion treatment under ice-cooling using an ultrasonic homogenizer (manufactured by IEDA TRADING Corporation, VCX-130) at an output power of 20 W for 1.5 min (0.6 kW·min/g). During the dispersion, the liquid temperature was maintained at 10° C. or lower. The resultant solution was subjected to a centrifugal separator treatment at 10,000 G for 15 min using a high-speed centrifuge (TOMY SEIKO CO., LTD., MX-300) to obtain 9 g of a dispersion liquid of carbon nanotubes. The average diameter of the dispersed carbon nanotubes in this dispersion liquid when measured with an AFM was 1.7 nm, indicating isolated dispersion. The length of the dispersed carbon nanotubes was 2.8 μm.

Thereafter, water was added to a final carbon nanotube aggregate concentration of 0.08% by mass to prepare a film coating solution. In accordance with Undercoat Layer Preparation Example, the film coating solution was applied onto a polyethylene terephthalate (PET) film (available from TORAY INDUSTRIES, INC. ("Lumirror" (registered trademark) U46), light transmittance: 90.4%, 15 cm×10 cm) provided with an undercoat layer. This coating solution was applied and dried in air, and then dried in a 120° C. drier for 1 min to immobilize the carbon nanotube composition. In accordance with Overcoat Layer Preparation Example, an overcoat layer was provided on a carbon nanotube layer to prepare a conductive film; the surface resistance was 600Ω/□, and the light transmittance was 90.0%.

Example 11

A paste was prepared in the same manner as in Example 5 except that the pH was adjusted to 7; the amount of dispersant adsorption to this carbon nanotube paste was 88%, and the particle size was 4.3 μm.

A dispersion liquid of carbon nanotubes was then prepared using this paste in the same manner as in Example 5 (0.6 kW·min/g); the average diameter of the dispersed carbon nanotubes in this dispersion liquid when measured with an AFM was 1.8 nm, indicating isolated dispersion. The length of the dispersed carbon nanotubes was 2.7 μm.

Thereafter, a conductive film was prepared in the same manner as in Example 5; the surface resistance was 660Ω/□, and the light transmittance was 90.0%.

Example 12

A paste was prepared in the same manner as in Example 5 except that the pH was adjusted to 9; the amount of dispersant adsorption to this carbon nanotube paste was 89%, and the particle size was 4.1 μm.

A dispersion liquid of carbon nanotubes was then prepared using this paste in the same manner as in Example 5 (0.6 kW·min/g); the average diameter of the dispersed carbon nanotubes in this dispersion liquid when measured with an AFM was 1.7 nm, indicating isolated dispersion. The length of the dispersed carbon nanotubes was 2.8 μm.

Thereafter, a conductive film was prepared in the same manner as in Example 5; the surface resistance was 600Ω/□, and the light transmittance was 90.0%.

Example 13

A paste was prepared in the same manner as in Example 5 except that the pH was adjusted to 11; the amount of dispersant adsorption to this carbon nanotube paste was 89%, and the particle size was 4.0 μm.

A dispersion liquid of carbon nanotubes was then prepared using this paste in the same manner as in Example 5 (0.6 kW·min/g); the average diameter of the dispersed carbon nanotubes in this dispersion liquid when measured with an AFM was 1.7 nm, indicating isolated dispersion. The length of the dispersed carbon nanotubes was 2.8 μm.

Thereafter, a conductive film was prepared in the same manner as in Example 5; the surface resistance was 620Ω/□, and the light transmittance was 90.0%.

Comparative Example 1

The wet carbon nanotube aggregate 1 obtained (15 mg in terms of dry weight) and 1.5 g of an aqueous solution of 1% by mass sodium carboxymethylcellulose (available from DAICEL FINECHEM LTD., "DAICEL" (registered trademark) 1140 (weight average molecular weight: 450,000)) were weighed out, and ion exchanged water was added thereto to 10 g. The pH was adjusted to 10 using a 28% aqueous ammonia solution (available from Kishida Chemical Co., Ltd.), and the resultant was subjected to a dispersion treatment under ice-cooling using an ultrasonic homogenizer (manufactured by IEDA TRADING Corporation, VCX-130) at an output power of 20 W for 1.5 min (1 kW·min/g) to prepare a carbon nanotube solution. During the dispersion, the liquid temperature was maintained at 10° C. or lower. The resultant solution was centrifuged at 10,000 G for 15 min using a high-speed centrifuge (TOMY SEIKO CO., LTD., MX-300) to obtain 9 g of a dispersion liquid of carbon nanotubes. The diameter of the dispersed carbon nanotubes in this dispersion liquid when measured with an AFM was 2.6 nm, indicating insufficient dispersion. The length of the dispersed carbon nanotubes was 2.1 μm.

Thereafter, a conductive film was prepared in the same manner as in Example 1; the surface resistance was 680Ω/□, and the light transmittance was 87.0% (transparent conductive film 87.0%/PET film 90.4%=0.96). In comparison with Example 1 in which a physical dispersion treatment was carried out in advance using a vibratory ball mill, although the length of the dispersed carbon nanotubes was not less than 2 μm and equivalent, dispersion was insufficient, and the dispersed carbon nanotubes had a large diameter and not sufficiently dispersed; therefore, the properties are considered to be worse than in Example 1.

Comparative Example 2

A dispersion liquid of carbon nanotubes was prepared in the same manner as in Comparative Example 1 except that an ultrasonic homogenizer (manufactured by IEDA TRADING Corporation, VCX-130) at an output power of 20 W for 7.5 min (5 kW·min/g) was employed; the diameter of the dispersed carbon nanotubes in this dispersion liquid when measured with an AFM was 1.4 nm, indicating isolated dispersion. The length of the dispersed carbon nanotubes was 1.8 μM.

Thereafter, a conductive film was prepared in the same manner as in Example 1; the surface resistance was 680Ω/□, and the light transmittance was 87.0% (transparent conductive film 87.0%/PET film 90.4%=0.96). In comparison with Example 1, the diameters of the dispersed carbon nanotubes were both not more than 1.7 nm plus 0.1 nm, and thus the isolated dispersion was achieved; however, the length of the dispersed carbon nanotubes was small, and thus the long-time ultrasonication caused destruction of graphite structure; therefore, the properties are considered to be worse than in Example 1.

Comparative Example 3

The diameter and length of the carbon nanotube paste prepared in Example 1 were measured, but they were outside the measurement range and could not be measured. Further, this carbon nanotube paste was used to produce a conductive film in the same manner as in Example 1, and the surface resistance was measured; however, it was outside the measurement range and could not be measured. Therefore, it is considered that, in Example 1, it is difficult to highly disperse carbon nanotube aggregates only by the physical dispersion treatment in step (A), and the ultrasonication in step (B) is essential for high dispersion.

Comparative Example 4

A carbon nanotube paste was prepared in the same manner as in Example 1 except that the time of the vibratory ball mill treatment was changed to 4 hours and that a treatment using an ultrasonic homogenizer was not performed, and the diameter and length of this paste were measured; however, they were outside the measurement range and could not be measured. Further, this carbon nanotube paste was used to produce a conductive film in the same manner as in Example 1, and the surface resistance was measured; however, it was outside the measurement range and could not be measured. Therefore, it is considered that, in Example 1, it is very difficult to highly disperse carbon nanotube aggregates even if the dispersion conditions are changed, for example, by increasing the strength of the physical dispersion treatment in step (A), and the ultrasonication in step (B) is essential for high dispersion.

The dispersion liquid of carbon nanotube aggregates of the present invention can be used as a material of a transparent conductive film, and the transparent conductive film finally obtained is mainly used as a transparent electrode related to displays which require surface smoothness, such as a touch panel, liquid crystal display, organic electroluminescence, and electronic paper.

DESCRIPTION OF SYMBOLS

1: Reactor
2: Board to place a catalyst
3: Catalyst
4: Mixture of a substance other than catalysts and a catalyst
5: Catalyst
401: Electric furnace
402: Quartz sintered plate
403: Reactor
404: Catalyst layer
405: Thermocouple
406: Waste gas pipe
407: Mass flow controller
408: Mixed gas-introduction tube

The invention claimed is:

1. A process for producing a dispersion liquid of carbon nanotube aggregates in which the carbon nanotube aggregates are dispersed in a dispersion medium, the process comprising:
  (A) adsorbing a dispersant to carbon nanotube aggregates by physical dispersion treatment in a dispersion medium to prepare a carbon nanotube paste with a particle size of 100 nm to 20 μm resulting from partial dissociation of a mass of the carbon nanotube aggregates; and
  (B) dispersing the carbon nanotube paste by ultrasonic dispersion treatment, performing a centrifugal separation treatment to form a precipitate,
  wherein the dispersant content in a precipitate after centrifugal separator treatment of the carbon nanotube paste obtained in step (A) at 10,000 G for 15 min is not less than 80% by mass of the total amount of the dispersant added into the container.

2. The process for producing a dispersion liquid of carbon nanotube aggregates according to claim 1, wherein, in step (A), the physical dispersion treatment is a collision treatment, wherein the carbon nanotube aggregates are collided with spheres in the dispersion medium containing the dispersant, in a container in which the carbon nanotube aggregates, the dispersant, the dispersion medium, and the spheres are placed or a treatment using any one of a magnetic stirrer, homo mixer, ribbon mixer, roll mill, rotary homogenizer, and paint shaker.

3. The process for producing a dispersion liquid of carbon nanotube aggregates according to claim 1, wherein, in step (B), the carbon nanotube paste is isolatedly dispersed by ultrasonic dispersion treatment.

4. The process for producing a dispersion liquid of carbon nanotube aggregates according to claim 1, wherein, in step (A), the physical dispersion treatment is a collision treatment, wherein the carbon nanotube aggregates are collided with spheres in the dispersion medium containing the dispersant, in a container in which the carbon nanotube aggregates, the dispersant, the dispersion medium, and the spheres are placed.

5. The process for producing a dispersion liquid of carbon nanotube aggregates according to claim 1, wherein, in step (A), the physical dispersion treatment is a vibration treatment of a container in which the carbon nanotube aggregates, the dispersant, the dispersion medium, and spheres are placed.

6. The process for producing a dispersion liquid of carbon nanotube aggregates according to claim 1, wherein, in step (A), a container in which each substance is placed is vibrated so that the mass ratio of the dispersant to the carbon nanotube aggregates is 10 or less.

7. The process for producing a dispersion liquid of carbon nanotube aggregates according to claim 1, wherein, in step (A), the concentration of the carbon nanotube aggregates is 0.1% by mass to 10% by mass based on the total mass of the carbon nanotube aggregates, the dispersant, and the dispersion medium.

8. The process for producing a dispersion liquid of carbon nanotube aggregates according to claim 1, wherein, in step (B), the concentration of the carbon nanotube aggregates in the carbon nanotube paste is 0.01% by mass to 1% by mass when the carbon nanotube paste is subjected to ultrasonic dispersion treatment.

9. The process for producing a dispersion liquid of carbon nanotube aggregates according to claim 1, wherein the carbon nanotube aggregates comprise double-walled carbon nanotubes.

10. The process according to claim 9, wherein at least 70 out of 100 carbon nanotubes are double-walled carbon nanotubes.

11. The process for producing a dispersion liquid of carbon nanotube aggregates according to claim 1, wherein the dispersant is a surfactant or water-soluble polymer.

\* \* \* \* \*